United States Patent
Hamid et al.

(10) Patent No.: US 11,322,340 B2
(45) Date of Patent: *May 3, 2022

(54) COUPLING OF ION MOBILITY SPECTROMETER WITH MASS SPECTROMETER

(71) Applicant: MOBILion Systems, Inc., Chadds Ford, PA (US)

(72) Inventors: Ahmed M. Hamid, Auburn, AL (US); John Daniel DeBord, West Grove, PA (US); Gordon A. Anderson, Benton City, WA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,827

(22) Filed: Aug. 7, 2020

(65) Prior Publication Data

US 2020/0373140 A1 Nov. 26, 2020

Related U.S. Application Data

(63) Continuation of application No. 16/412,271, filed on May 14, 2019, now Pat. No. 10,741,375.

(Continued)

(51) Int. Cl.
*H01J 49/06* (2006.01)
*G01N 27/622* (2021.01)
*H01J 49/10* (2006.01)

(52) U.S. Cl.
CPC .......... *H01J 49/062* (2013.01); *G01N 27/622* (2013.01); *H01J 49/061* (2013.01); *H01J 49/107* (2013.01)

(58) Field of Classification Search
CPC ........ H01J 49/06; H01J 49/061; H01J 49/062; H01J 49/26; H01J 49/40; G01N 27/622
See application file for complete search history.

(56) References Cited

U.S. PATENT DOCUMENTS

| 5,789,745 | A  | 8/1998 | Martin et al. |
| 6,791,078 | B2 | 9/2004 | Giles et al.  |

(Continued)

FOREIGN PATENT DOCUMENTS

| EP | 1942340 | 7/2008  |
| GB | 2457769 | 10/2008 |

(Continued)

OTHER PUBLICATIONS

"ESI/Ion Trap/Ion Mobility/Time-of-Flight Mass Spectrometry For Rapid and Sensitive Analysis of Biomolecular Mixtures," Henderson et al., Anal. Chem., vol. 71, Iss. 2, pp. 291-301, Jan. 15, 1999 (Abstract Only).

(Continued)

*Primary Examiner* — David E Smith
(74) *Attorney, Agent, or Firm* — McCarter & English, LLP

(57) ABSTRACT

Disclosed is an ion carousel having a first surface and a second surface adjacent to the first surface. The second surface includes a first inner array of electrodes arranged along a first loop path and configured to receive a first ion packet and a second ion packet temporally separated from the first ion packet by a separation time. The first inner array of electrodes generates a traveling waveform which includes a plurality of potential wells that travel along the first loop path and receive ions from the first and second ion packets. The plurality of potential wells include at least a first potential well and a second potential well. An output switch is configured to selectively eject ions from the first potential (Continued)

well out of the carousel at time T1 and eject ions from the second potential well out of the carousel at time T2.

40 Claims, 12 Drawing Sheets

Related U.S. Application Data

(60) Provisional application No. 62/671,126, filed on May 14, 2018.

(56) References Cited

U.S. PATENT DOCUMENTS

| | | |
|---|---|---|
| 6,794,641 B2 | 9/2004 | Bateman et al. |
| 6,800,846 B2 | 10/2004 | Bateman et al. |
| 6,812,453 B2 | 11/2004 | Bateman et al. |
| 6,872,939 B2 | 3/2005 | Bateman et al. |
| 6,884,995 B2 | 4/2005 | Bateman et al. |
| 6,914,241 B2 | 7/2005 | Giles et al. |
| 7,071,467 B2 | 7/2006 | Bateman et al. |
| 7,095,013 B2 | 8/2006 | Bateman et al. |
| 7,154,088 B1 | 12/2006 | Blain et al. |
| 7,157,698 B2 | 1/2007 | Makarov et al. |
| 7,205,538 B2 | 4/2007 | Bateman et al. |
| 7,342,224 B2 | 3/2008 | Makarov et al. |
| 7,405,401 B2 | 7/2008 | Hoyes |
| 7,456,394 B2 | 11/2008 | Cameron et al. |
| 7,491,930 B2 | 2/2009 | Shvartsburg et al. |
| 7,507,953 B2 | 3/2009 | Makarov et al. |
| 7,714,278 B2 | 5/2010 | Boyle et al. |
| 7,829,841 B2 | 11/2010 | Bateman et al. |
| 7,838,826 B1 | 11/2010 | Park |
| 7,888,635 B2 | 2/2011 | Belov et al. |
| 7,960,694 B2 | 6/2011 | Hoyes |
| 8,288,717 B2 | 10/2012 | Park |
| 8,319,177 B2 | 11/2012 | Boyle et al. |
| 8,389,933 B2 | 3/2013 | Hoyes |
| 8,487,240 B2 | 7/2013 | Koehl |
| 8,581,177 B2 | 11/2013 | Kovtoun |
| 8,742,339 B2 | 6/2014 | Hoyes |
| 8,809,769 B2 | 8/2014 | Park |
| 8,907,273 B1 | 12/2014 | Chen et al. |
| 8,921,772 B2 | 12/2014 | Verenchikov |
| 8,941,054 B2 | 1/2015 | Park et al. |
| 8,941,055 B2 | 1/2015 | Park et al. |
| 8,946,626 B2 | 2/2015 | Giles et al. |
| 9,082,604 B2 | 7/2015 | Verenchikov |
| 9,123,516 B2 | 9/2015 | Hasegawa et al. |
| 9,123,518 B2 | 9/2015 | Giles et al. |
| 9,281,170 B2 | 3/2016 | Park et al. |
| 9,417,211 B2 | 8/2016 | Verenchikov |
| 9,425,035 B2 | 8/2016 | Giles et al. |
| 9,429,543 B2 | 8/2016 | Jiang et al. |
| 9,455,132 B2 | 9/2016 | Mordehai et al. |
| 9,683,964 B2 | 6/2017 | Park et al. |
| 9,741,552 B2 | 8/2017 | Park et al. |
| 9,865,442 B2 | 1/2018 | Giles et al. |
| 9,880,129 B2 | 1/2018 | Bateman |
| 9,887,074 B2 | 2/2018 | Belov |
| 9,939,408 B2 | 4/2018 | Giles et al. |
| 9,939,409 B2 | 4/2018 | Ibrahim et al. |
| 10,018,592 B2 | 7/2018 | Ibrahim et al. |
| 10,032,617 B2 | 7/2018 | Welkie |
| 10,060,879 B2 | 8/2018 | Silveira |
| 10,224,196 B2 | 3/2019 | Giles et al. |
| 10,241,079 B2 | 3/2019 | Betz et al. |
| 10,317,362 B2 | 6/2019 | Harder et al. |
| 10,317,364 B2 | 6/2019 | Garimella et al. |
| 10,319,575 B2 | 6/2019 | Brown et al. |
| 10,408,792 B2 | 9/2019 | Betz et al. |
| 10,460,920 B1 | 10/2019 | Smith et al. |
| 10,466,202 B2 | 11/2019 | Ibrahim et al. |
| 10,473,620 B2 | 11/2019 | Harder et al. |
| 10,497,552 B2 | 12/2019 | Ibrahim et al. |
| 10,522,337 B2 | 12/2019 | Rizzo et al. |
| 10,692,710 B2 | 6/2020 | Prabhakaran et al. |
| 10,720,315 B2 | 7/2020 | Taghioskoui |
| 10,741,375 B2* | 8/2020 | Hamid .................. H01J 49/062 |
| 10,804,089 B2 | 10/2020 | Ibrahim et al. |
| 10,811,244 B2 | 10/2020 | Green et al. |
| 10,840,077 B2 | 11/2020 | Taghioskoui |
| 10,861,687 B2 | 12/2020 | Wildgoose et al. |
| 2001/0032929 A1 | 10/2001 | Fuhrer et al. |
| 2006/0289747 A1 | 12/2006 | Schultz et al. |
| 2009/0014641 A1* | 1/2009 | Bateman .............. G01N 27/622 |
| | | 250/282 |
| 2009/0101810 A1 | 4/2009 | McLean et al. |
| 2010/0193678 A1* | 8/2010 | Clemmer .............. H01J 49/408 |
| | | 250/282 |
| 2015/0276676 A1 | 10/2015 | Jiang et al. |
| 2016/0071715 A1 | 3/2016 | Anderson et al. |
| 2017/0076926 A1* | 3/2017 | Green ................. H01J 49/0027 |
| 2019/0004011 A1 | 1/2019 | Garimella et al. |
| 2019/0103261 A1 | 4/2019 | Ibrahim et al. |
| 2019/0348268 A1 | 11/2019 | Hamid et al. |
| 2019/0369049 A1 | 12/2019 | Ridgeway |
| 2019/0369050 A1 | 12/2019 | Garimella et al. |
| 2020/0161119 A1 | 5/2020 | Richardson et al. |
| 2020/0200708 A1 | 6/2020 | Ibrahim et al. |
| 2020/0321190 A1 | 10/2020 | Ibrahim et al. |
| 2020/0321208 A1 | 10/2020 | Cooks et al. |
| 2020/0326304 A1 | 10/2020 | Giles et al. |
| 2020/0378922 A1 | 12/2020 | Ibrahim et al. |
| 2020/0381241 A1 | 12/2020 | Park et al. |
| 2020/0395202 A1 | 12/2020 | Richardson et al. |
| 2021/0080429 A1 | 3/2021 | Debord et al. |

FOREIGN PATENT DOCUMENTS

| | | |
|---|---|---|
| WO | WO 2020/201732 | 10/2020 |
| WO | WO 2020/240197 | 12/2020 |
| WO | WO 2020/243194 | 12/2020 |

OTHER PUBLICATIONS

"Separation of Isomeric Peptides Using Electrospray Ionization/High-Resolution Ion Mobility Spectrometry," Wu et al., Anal. Chem., vol. 72, Iss. 2, pp. 391-395, Jan. 15, 2000 (Abstract Only).
"Ion Trap/Ion Mobility/Quadrupole/Time-of-Flight Mass Spectrometry for Peptide Mixture Analysis," Hoaglund-Hyzer et al., Anal. Chem., vol. 73, Iss. 2, pp. 177-184, Jan. 15, 2001 (Abstract Only).
"Ion Mobility—Mass Spectrometry," Jiang et al., Encyclopedia of Anal. Chem., DOI: 10.1002/9780470027318.a9292, 2013.
"Development of a New Ion Mobility Time-Of Flight Mass Spectrometer," Ibrahim et al., Int'l Journal of Mass Spectrometry, 377 (2015) 655-662, Jul. 28, 2014.
"A New Ion Mobility-Linear Ion Trap Instrument for Complex Mixture Analysis," Donohoe, et al., Anal. Chem., vol. 86, Iss. 16, pp. 8121-8128, Aug. 19, 2014.
"Ion Trapping, Storage, and Ejection in Structures for Lossless Ion Manipulations," Zhang et al., Anal. Chem. 2015, 87, 6010-6016, May 14, 2015.
PCT International Search Report and Written Opinion dated Aug. 6, 2019 for PCT Application No. PCT/US2019/032297.
"Ion Mobility Spectrometry with High Ion Utilization Efficiency Using Traveling Wave-Based Structures for Lossless Ion Manipulations (SLIM)," Li, et al., poster presented at the Proceedings of the 68th ASMS Conference on Mass Spectrometry and Allied Topics, Online Meeting, Jun. 1-12, 2020.
"Ion Mobility Spectrometry with High Ion Utilization Efficiency Using Traveling Wave-Based Structures for Lossless Ion Manipulations," Li et al., Anal. Chem., vol. 92, Iss. 22, pp. 14930-14938, Oct. 26, 2020.
U.S. Appl. No. 62/671,126, filed May 14, 2018.
U.S. Appl. No. 16/412,271, filed May 14, 2019, US 2019/0348268 A1.

(56) References Cited

OTHER PUBLICATIONS

PCT/US2019/032297, May 14, 2019, WO/2019/222274.

* cited by examiner

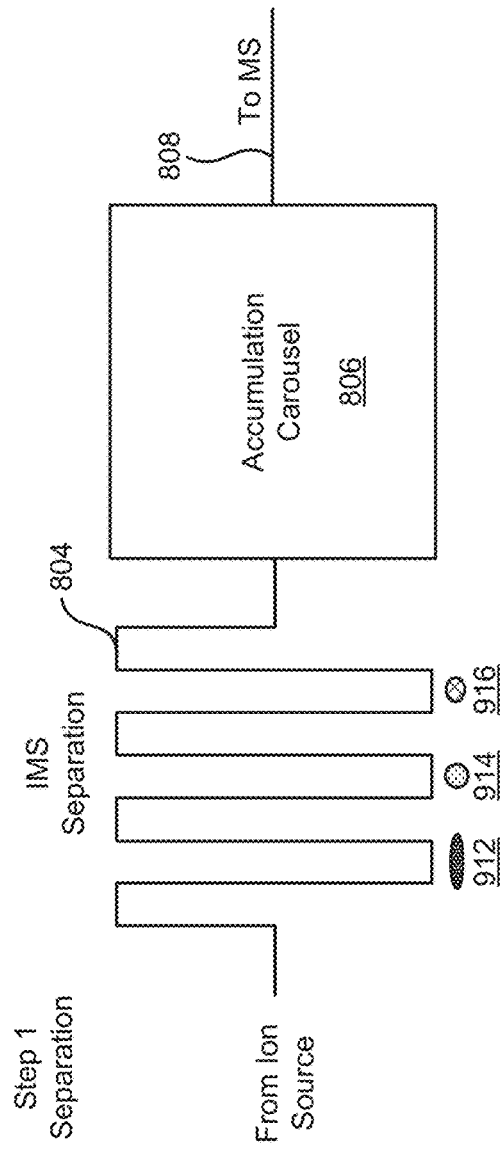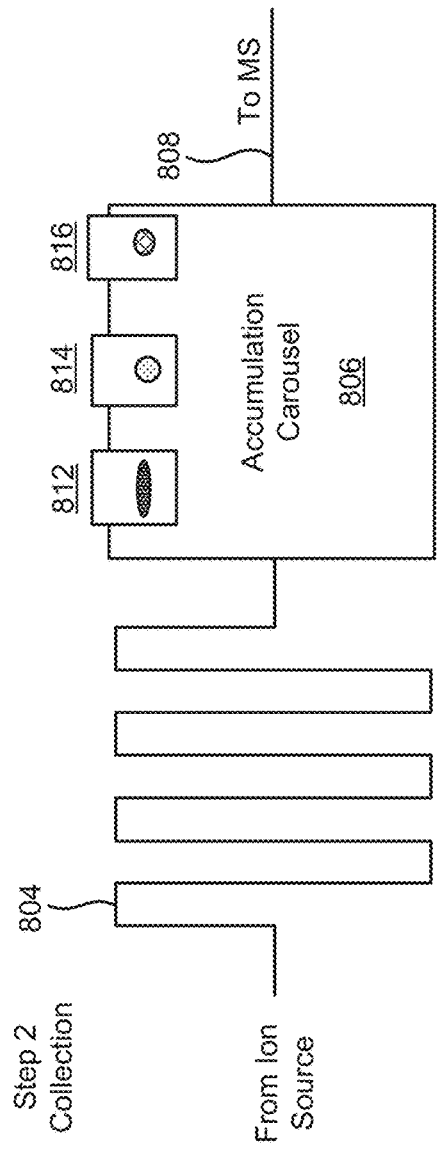

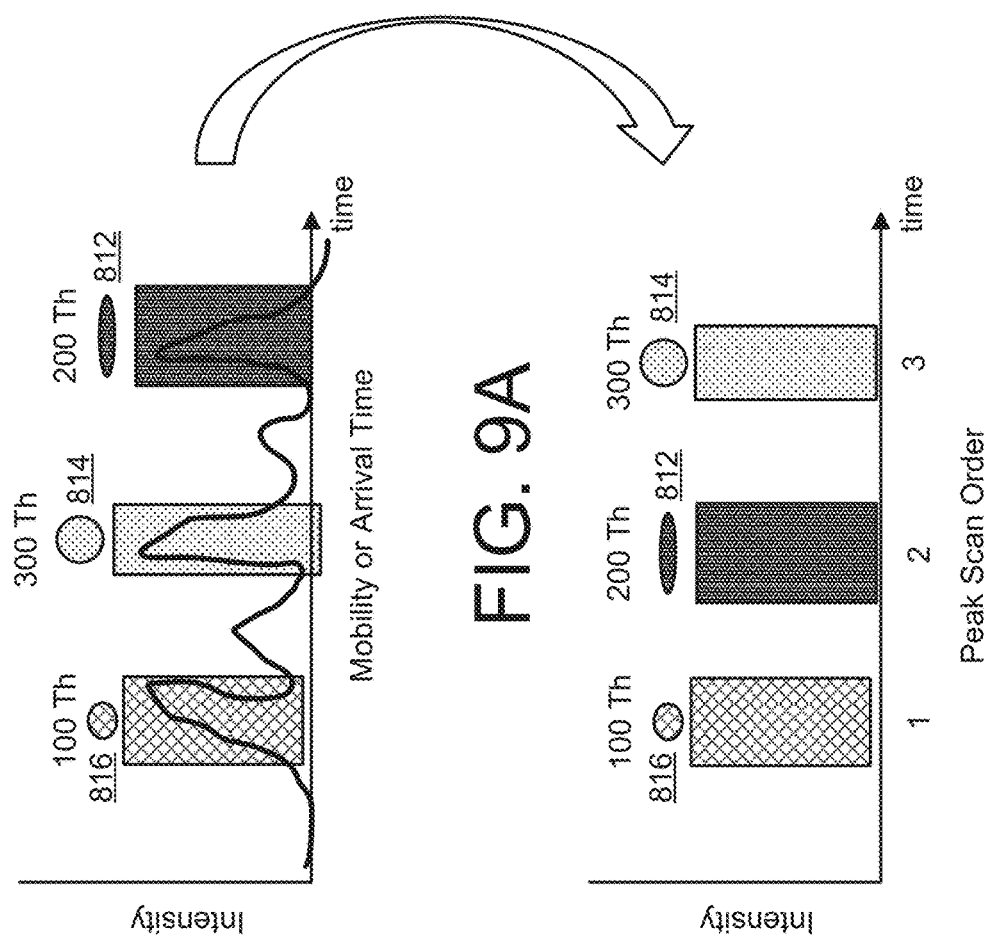

COUPLING OF ION MOBILITY SPECTROMETER WITH MASS SPECTROMETER

CROSS-REFERENCE TO RELATED APPLICATIONS

This application is a continuation of U.S. patent application Ser. No. 16/412,271, filed on May 14, 2019, entitled Coupling of Ion Mobility Spectrometer with Mass Spectrometer, which claims the benefit of priority under 35 U.S.C. § 119(e) to U.S. Provisional Patent Application No. 62/671,126, filed on May 14, 2018, the entire contents of each of these applications are hereby incorporated by reference.

BACKGROUND

Ion mobility spectrometry (IMS) is a technique for separating and identifying ions in gaseous phase based on their mobilities. For example, IMS can be employed to separate structural isomers and macromolecules that have different mobilities. IMS relies on applying a constant or a time-varying electric field to a mixture of ions. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be spatially separated based on their mobility. Because ions with different mobilities arrive at the end of the drift tube at different times (temporal separation), and they can be identified based on the time of detection by a detector at the end of the drift tube. Resolution of the mobility separation can be varied by changing the separation distance.

Mass spectrometry (MS) is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection. Ions with different mass-to-charge ratios can undergo different deflections, and can be identified based on the spatial location of detection by a detector (e.g., electron multiplier).

IMS combined with MS can generate an IMS-MS spectrum that can be used in a broad range of applications, including metabolomics, glycomics, and proteomics. IMS-MS ion separation can be performed by coupling an ion mobility spectrometer with a mass spectrometer. For example, an ion mobility spectrometer can first separate the ions based on their mobility. Ions having different mobilities can arrive at the mass spectrometer at different times, and are then separated based on their mass-to-charge ratio. An example of an IM spectrometer is a structures for lossless ion manipulations (SLIM) device that can generate an IMS spectrum with minimal ion loss.

SUMMARY

In general, embodiments of the disclosure provide systems and corresponding methods for coupling of an ion mobility spectrometer with a mass spectrometer.

An embodiment of the present disclosure is directed to an ion carousel that includes a first surface and a second surface adjacent to the first surface. The first and the second surfaces define an ion confinement volume, the second surface including a first inner array of electrodes arranged along a first loop path and configured to receive, at a first location on the first path, a first ion packet and a second ion packet temporally separated from the first ion packet by a separation time.

The first inner array of electrodes are configured to generate a traveling waveform which includes a plurality of potential wells that travel along a first direction on the first loop path and are configured to receive ions from the first and second ion packets. In such an embodiment, the plurality of potential wells can include at least a first potential well and a second potential well; and an output switch configured to selectively eject ions from the first potential well out of the carousel at time T1 and eject ions from the second potential well out of the carousel at time T2.

It is envisioned that the first ion packet can include a first sub-packet of ions having a first mobility and a second sub-packet of ions having a second mobility, and the second ion packet includes a third sub-packet of ions having the first mobility and a fourth sub-packet of ions having the second mobility.

Still further, in certain constructions, the first potential well receives the first sub-packet of ions and the third sub-packet of ions, and the second potential well receives the second sub-packet of ions and the fourth sub-packet of ions.

It is envisioned that the difference in time between T1 and T2 can be based on a scan rate for a mass spectrometer which is configured to receive the ejected ions from carousel.

The velocity of the traveling waveform can be set at a value below the speed of the ions in the first and second packet with the lowest mobility preventing mobility separation from occurring as the ions traverse the first loop path. Alternatively, the velocity of the traveling waveform can be set at a value higher than the speed of the ions in the first and second packet with the lowest mobility thereby promoting mobility based separation to occur as the ions traverse the first loop path.

In certain constructions, the first sub-packet of ions is temporally separated from the second sub-packet of ions prior to receipt into the carousel and the third sub-packet of ions is temporally separated from the fourth sub-packet of ions prior to entry into the carousel. It is envisioned that the separation time between receipt of the first ion packet and the second ion packet at the first location correlates with the velocity of the traveling waveform.

In certain embodiments, the output switch is proximal to a second location along the first path, the output switch is configured to: generate a first ejection potential during a first ejection period, the first ejection potential configured to drive ions out of the ion carousel at the second location, and generate a first confinement potential during a first confinement period, the first confinement potential configured to prevent ions in the ion carousel from exiting the ion carousel at the second location. Still further, the output switch can be configured to selectively transfer ions in the first potential well out of the ion carousel by synchronizing the first ejection period with a first time of arrival of the first potential well at the second location. Moreover, the output switch can be configured to generate a second ejection potential during a second ejection period, the second ejection potential configured to drive ions out of the ion carousel at the second location.

In certain embodiments the output switch is configured to selectively transfer ions in the second potential well out of the ion carousel by synchronizing the second ejection period with a second time of arrival of the second potential well at the second location.

The output switch could be configured to prevent ions in the second potential well from exiting the ion carousel by synchronizing the first confinement period with a second time of arrival of the second potential well at the second location.

In certain embodiments of the present disclosure, the first ion packet includes a fifth sub-packet of ions having a third mobility and the second ion packet includes a sixth sub-packet of ions having the third mobility, wherein the plurality of potential wells include a third potential well configured to receive the fifth sub-packet and the sixth sub-packet. Additionally, the output switch can be configured to selectively transfer ions in the third potential well out of the ion carousel by synchronizing the second ejection period with a third time of arrival of the third potential well at the second location.

Preferably, the first inner array of electrodes can be configured to reverse the first direction of travel of the second potential well and direct the second potential well to the second location.

Additionally, the output switch can be configured to selectively transfer ions in the second potential well out of the ion carousel by synchronizing a third ejection period with a fourth time of arrival of the second potential well at the second location, wherein the output switch is configured to generate a third ejection potential during the third ejection period, the third ejection potential configured to drive ions out of the second potential well at the second location.

It is envisioned that in certain embodiments can further include a controller, the controller including a first DC control circuit configured to: apply the first ejection voltage and the first confinement voltage to the output switch during the first ejection period and the first confinement period, respectively; and apply the second ejection voltage to the output switch during the second ejection period. In certain constructions, the controller includes a master control circuit communicatively coupled to the first DC control circuit wherein the master control circuit is configured to: determine one or more of the first ejection period, the first confinement period, and the second ejection period; and provide a first control signal to the DC control switch, wherein the DC control switch is configured to generate one or more of the first ejection voltage during the first ejection period, first confinement voltage during the first confinement period, and the second ejection voltage during the second ejection period.

It is further envisioned that ions in the first potential well, the second potential well and the third potential well can be transferred to a first ion manipulation device at the second location, wherein a first end of the first ion manipulation device can be coupled to the ion carousel and a second end of the first ion manipulation device is coupled to a mass spectrometer.

Certain embodiments of the carousel further include a second array of electrodes having a first electrode and a second electrode, wherein the first inner array of electrodes is located between the first electrode and the second electrode. Preferably, the first electrode and the second electrode are configured to receive one or more RF voltages and generate a pseudopotential configured to inhibit ions in the ion confinement volume from approaching the second surface.

The present disclosure is further directed to an ion carousel that includes a first surface; and a second surface adjacent to the first surface, the first and the second surfaces defining an ion confinement volume. The second surface includes a first inner array of electrodes arranged along a first loop path and configured to receive, at a first location on the first path, a first ion packet and a second ion packet temporally separated from the first ion packet by a separation time. Additionally, the first inner array of electrodes are configured to generate a traveling waveform which includes a plurality of potential wells that travel along a first direction on the first loop path and configured to receive ions from the first and second ion packets, the plurality of potential wells including at least a first potential well and a second potential well. The carousel also including an output switch proximal to a second location along the first path, the output switch is configured to: generate, during a first confinement period, a first confinement potential configured to prevent ions in the potential wells from exiting the ion carousel, generate, during a first ejection period after the first confinement period, a first ejection potential configured to eject ions in the first potential well; and generate, during a second ejection period after the first confinement period, a second ejection potential configured to eject ions in the second potential well.

Preferably, the output switch can be configured to eject ions from the first potential well out of the carousel at time T1 and eject ions from the second potential well out of the carousel at time T2.

It is envisioned that the output switch can be configured to selectively transfer ions in the first potential well out of the ion carousel by synchronizing the first ejection period with a first time of arrival of the first potential well at the second location. Moreover, the output switch can be configured to generate a second ejection potential during a second ejection period, the second ejection potential configured to drive ions out of the ion carousel at the second location.

Still further, in certain embodiments, the output switch can be configured to selectively transfer ions in the second potential well out of the ion carousel by synchronizing the second ejection period with a second time of arrival of the second potential well at the second location.

Additionally, the output switch can be configured to prevent ions in the second potential well from exiting the ion carousel by synchronizing the first confinement period with a second time of arrival of the second potential well at the second location.

The present disclosure is further directed to a method for accumulating ions that includes the steps of:

providing an ion carousel that includes a first surface and a second surface adjacent to the first surface; the first and the second surfaces defining an ion confinement volume, the second surface including a first inner array of electrodes arranged along a first loop path;

receiving, at a first location on the first path of the ion carousel, a first ion packet and a second ion packet temporally separated from the first ion packet by a separation time;

generating a traveling waveform using the first inner array of electrodes which includes a plurality of potential wells that travel along a first direction on the first loop path and are configured to receive ions from the first and second ion packets, the plurality of potential wells comprising at least a first potential well and a second potential well; and selectively ejecting ions from the first potential well out of the carousel at time T1 and ejecting ions from the second potential well out of the carousel at time T2 using an output switch associated with the carousel.

It is envisioned that the first ion packet can include a first sub-packet of ions having a first mobility and a second sub-packet of ions having a second mobility, and the second ion packet includes a third sub-packet of ions having the first mobility and a fourth sub-packet of ions having the second mobility.

It is also envisioned that the method can further include the steps of: receiving in the first potential well the first sub-packet of ions and the third sub-packet of ions, and receiving in the second potential well the second sub-packet of ions and the fourth sub-packet of ions.

In certain embodiments, the difference in time between T1 and T2 is based on a scan rate for a mass spectrometer which is configured to receive the ejected ions from carousel.

Embodiments of the methods can also include the step of setting a velocity of the traveling waveform at a value below the speed of the ions in the first and second packet with the lowest mobility preventing mobility separation from occurring as the ions traverse the first loop path. Alternatively, the a velocity of the traveling waveform can be set at a value higher than the speed of the ions in the first and second packet with the lowest mobility thereby promoting mobility based separation to occur as the ions traverse the first loop path.

In certain embodiments, the first sub-packet of ions is temporally separated from the second sub-packet of ions prior to receipt into the carousel and the third sub-packet of ions is temporally separated from the fourth sub-packet of ions prior to entry into the carousel.

The separation time between receipt of the first ion packet and the second ion packet at the first location can correlate with a velocity of the traveling waveform.

In certain embodiments, the output switch is proximal to a second location along the first path, the output switch: generates a first ejection potential during a first ejection period, the first ejection potential configured to drive ions out of the ion carousel at the second location, and generates a first confinement potential during a first confinement period, the first confinement potential configured to prevent ions in the ion carousel from exiting the ion carousel at the second location.

Preferably, embodiments of the claimed method can include the step of selectively transferring, using the output switch, ions in the first potential well out of the ion carousel by synchronizing the first ejection period with a first time of arrival of the first potential well at the second location.

Additionally, embodiments can include the step of generating a second ejection potential during a second ejection period using the output switch, the second ejection potential configured to drive ions out of the ion carousel at the second location.

It is envisioned that the output switch can be configured to selectively transfer ions in the second potential well out of the ion carousel by synchronizing the second ejection period with a second time of arrival of the second potential well at the second location.

BRIEF DESCRIPTION OF THE FIGURES

These and other features will be more readily understood from the following detailed description taken in conjunction with the accompanying drawings, in which:

FIGS. 8A-8E illustrate exemplary resorting of time of release of ions of different mobility in various potential wells;

FIG. 9A illustrates the time of arrival of ion packets in FIG. 8A at the ion carousel from the input SLIM device; and FIG. 9B illustrates the ejection of ion packets in FIG. 8A from the ion carousel to the input SLIM device.

DETAILED DESCRIPTION

Figure 1:
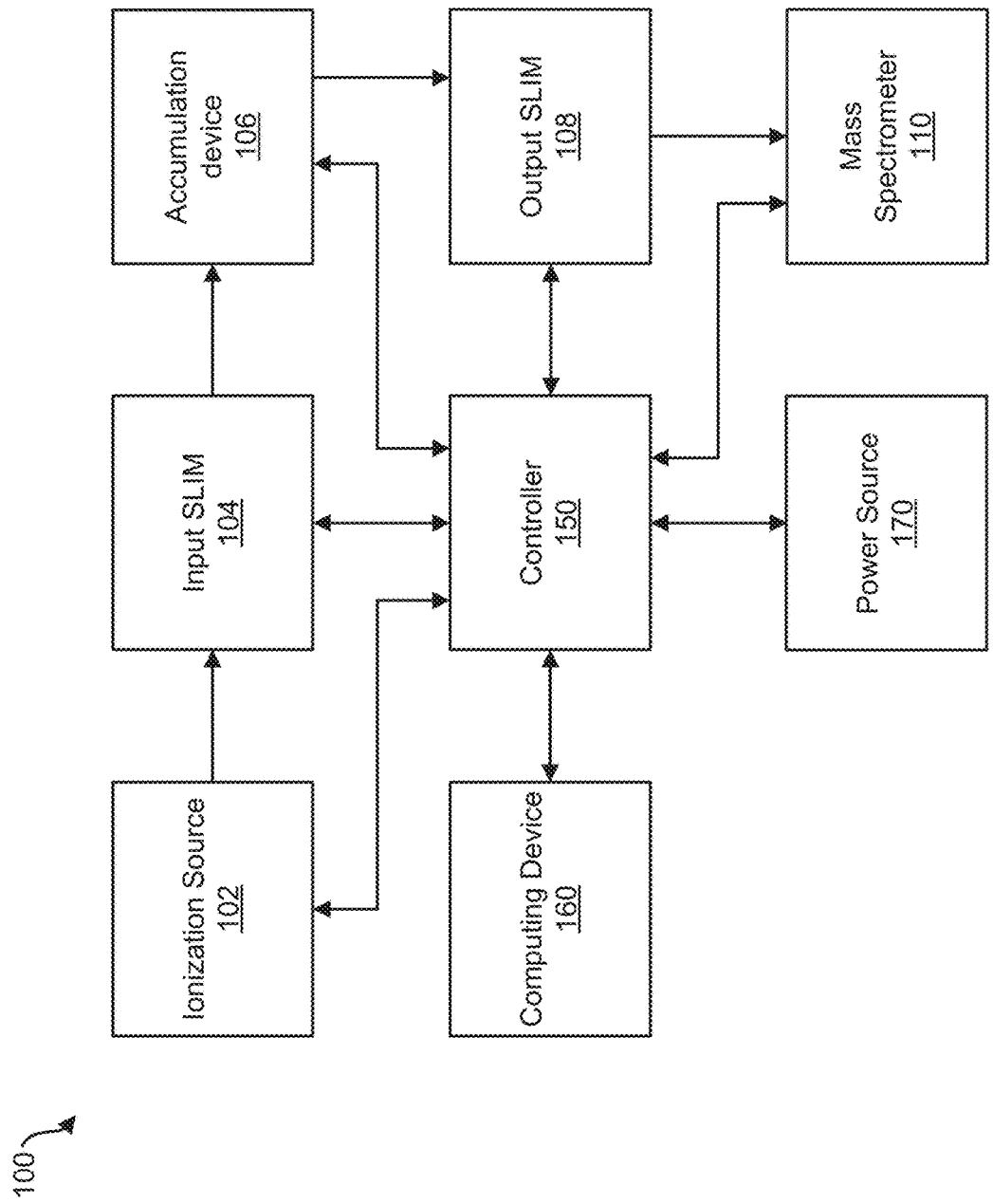
FIG. 1 is a schematic illustration of an exemplary SLIM-device-mass-spectrometer (SLIM-MS) coupling that is independent of scan rates of SLIM device and mass spectrometer.

Certain exemplary embodiments will now be described to provide an overall understanding of the principles of the structure, function, manufacture, and use of the systems, devices, and methods disclosed herein.

Coupling of ion mobility spectrometry with mass spectrometry (IMS-MS coupling) can allow for separation of ions based on both ion mobility and mass-to-charge ratio. Separating ions based on both their mobility and mass-to-charge ratio can allow for characterization of complex biological mixture. IMS-MS coupling can produce an IMS-MS spectrum. The IMS-MS spectrum can be represented by a two-dimensional plot where a first axis represents separation based on mobility and a second axis represents separation based on mass-to-charge ratio. IM spectrometers, such as structures for lossless ion manipulations (SLIM), can have short scan times (e.g., scan times in the order of milliseconds). In other words, a SLIM device can perform ion mobility separation of an ion mixture (e.g., from an ionization source) and generate an ion packet in a short time (e.g., milliseconds). The ion packet can include multiple ion sub-packets having ions of different mobilities that are temporally separated. For example, the separation between adjacent ion sub-packets can be in the millisecond regime. Mass spectrometers, on the other hand, can have long scan times. For example, quadrupole mass spectrometers can take several milliseconds to separate ions based on their mass-to-charge ratio.

Mismatch between the scan times of SLIM devices and mass spectrometers can affect the resolution of ion separation of IMS-MS device. For example, a mass spectrometer, having a scan time greater than the temporal separation between adjacent ion sub-packets, may not be able to resolve the mass-to-charge spectrum of the adjacent ion sub-packets. Mass spectrometers, such as time-of-flight (TOF) spectrometers, can have shorter scan times (e.g., in the microsecond regime). However, TOF spectrometers may need to repeat measurements on several ion packets from the SLIM device. For example, this may be needed so that mass and ion mobility spectra of multiple ion packets are added (referred to as "co-adding") to achieve acceptable signal-to-noise ratio. However, addition of mass and ion mobility spectra need to be carefully synchronized. For example, it can be desirable that mass spectrum of ion sub-packets that have similar mobilities are added. This can be challenging, for example, when mass spectra of large numbers of ion sub-packets that arrive at the TOF spectrometer at different times need to be added. Additionally, adding mass spectrum of multiple ion sub-packet can require a digitizer in the TOF that can increase the cost and the complexity of the TOF and can decrease the efficiency of the TOF.

Therefore, it can be desirable to develop systems and methods of coupling SLIM devices with mass spectrometers that have different scan rates. Subject matter described in this application provides for an ion carousel that can act as a liaison between a SLIM device and a mass spectrometer. The ion carousel can receive ion packets from an input SLIM device and place ion sub-packets having similar mobility in a given potential well. The ion carousel can selectively eject ions of similar mobility into the mass spectrometer. Further, temporal separation between ejection of ions of different mobility can be determined based on the scan rate of the mass spectrometer. This can prevent overlapping of mass spectra of different mobilities. Additionally, addition of multiple ion packets in the accumulation device prior to ejection to the mass spectrometer can obviate the need for adding mass spectra for improved signal-to-noise ratio.

FIG. 1 is a schematic illustration of an exemplary coupled SLIM-device-mass-spectrometer (SLIM-MS) 100. The coupled SLIM-MS 100 includes an ionization source 102 that can generate ions (e.g., ions having varying mobility and mass-to-charge-ratios) and inject the ions into an input SLIM device 104. This can be done at multiple time instances (e.g., periodically). During an ion separation event, the input SLIM device 104 can receive the ions from the ionization source 102 and generate an ion packet in which the ions are separated (e.g., temporally and spatially) into multiple ion sub-packets based on their mobility. In some implementations, an ion funnel trap can be used to generate ion packets.

The input SLIM device 104 can inject the ion packet into an ion carousel 106 during an accumulation period. For example, ion sub-packets with different mobilities can arrive at the ion carousel 106 at different times. The ion carousel 106 can generate a pseudopotential that can inhibit ions from approaching a surface of the ion carousel 106 and a traveling waveform that includes potential wells (e.g., by application of one or more of an RF and/or AC and/or DC voltage on electrodes in the ion carousel). The traveling waveform can be configured to move in the ion carousel such that ion sub-packets from different ion packets that have similar mobility (e.g., mobility in a given mobility range) are injected into one or more predetermined potential wells. The potential wells can prevent diffusion of ions from one potential well to the adjacent potential well. This can prevent mixing of ions of different mobilities in the ion carousel 106.

During an ejection period, ions trapped in one or more potential wells of the waveform in the ion carousel 106 are ejected into an output SLIM device 108. Ions can be ejected based on their mobility at different times. For example, ions having a desirable range of mobility that are trapped in one or more potential wells (e.g., adjacent potential wells) can be released into the output SLIM device 108. The output SLIM device 108 can guide the released ions to the mass spectrometer 110 that can detect the mass spectrum. The release time interval between successive ion ejections into the output SLIM device 108 can be determined based on the scan rate of the mass spectrometer 110. For example, the release time interval can be chosen to be longer than the time taken by the mass spectrometer to measure a mass spectrum. This can prevent overlap between mass spectra of successive ion ejections.

The controller 150 can control the operation of ionization source 102, input SLIM device 104, ion carousel 106, output SLIM device 108 and the mass spectrometer 110. The controller 150 can control the ion separation event (e.g., accumulation time, rate of injection of ions into the input SLIM device 104 by the ionization source 102, operation of the input SLIM device 104, and the like). The controller 150 can also control the characteristics and motion of potential waveform in the ion carousel 106. For example, controller 150 can synchronize the arrival time of an ion sub-packet (from the ion separation event) with the trajectory of a potential well designated to receive the ion sub-packet in the ion carousel 106. The controller 150 can also control the ejection of ions trapped in the potential wells of the waveform in the ion carousel 106. For example, the controller 150 can control an output switch in the ion carousel that can be activated to a confinement state to confine ions in the ion carousel 106. The output switch can be activated to an ejection state to eject ions trapped in the potential waveform in ion carousel 106 to output SLIM device 108. The controller 150 can also determine the time duration of the ejection state (e.g., based on desired ion mobility resolution of the IMS-MS spectrum). Furthermore, the controller can determine the delay time between successive ion ejections. The controller 150 can determine the delay time based on, for example, scan rate of the mass spectrometer 110, mass of the ions, charge of the ions, and the like. The controller 150 can include multiple controller modules that are distributed over the coupled SLIM-device-mass-spectrometer (SLIM-MS) 100.

The controller 150 can include multiple power supply modules (e.g., current/voltage supply circuits) that generate various voltage (or current) signals that drive the electrodes in the coupled SLIM-MS 100. For example, the controller 150 can include RF control circuits that generate RF voltage signals, traveling wave control circuits that generate traveling wave voltage signals, DC control circuits that generate DC voltage signals, etc. The RF voltage signals, traveling wave voltage signals, DC voltage signal can be applied to electrodes in the input SLIM device 104, ion carousel 106, output SLIM device 108, and the various input/output switches. The controller 150 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the coupled SLIM-MS 100.

In some implementations, one or more components of the coupled SLIM-MS 100 (e.g., input SLIM device 104, ion carousel 106, output SLIM device 108 etc.) can generate traveling potential waveforms (e.g., resulting from potentials generated by multiple electrodes in the component(s) of the coupled SLIM-MS 100). The potential waveform can travel at a predetermined velocity based on, for example, frequency of voltage signals applied to the electrodes. In some implementations, the speed of the potential waveform can determine whether a mobility-based separation occurs or not. For example, speed of a potential waveform in the ion carousel 106 can be set to a value below the speed associated with ions having the lowest mobility. This can prevent ion mobility separation, and the traveling waveform can be used to transport ions (e.g., in separate potential wells). Additionally or alternately, speed of a potential waveform in the input SLIM device 104 (or output SLIM device 108) can be set to a higher value than the aforementioned example. This can result in mobility-based separation (e.g., in input SLIM device 104).

In some implementations, the traveling potential waveform can be spatially periodic and the spatial periodicity can depend on the phase differences between the voltage signals applied to adjacent electrode pairs. In some implementations, the phase differences can determine the direction of propagation of the potential waveform. The master control circuit can control the frequency and/or phase of voltage outputs of RF/traveling wave control circuits such that the traveling potential waveform has a desirable (e.g., predetermined) spatial periodicity and/or speed.

In some implementations, the controller 150 can be communicatively coupled to a computing device 160. For example, the computing device 160 can provide operating parameters of the coupled SLIM-MS 100 via a control signal to the master control circuit. In some implementations, a user can provide the computing device 160 (e.g., via a user interface) with the operating parameters. Based on the operating parameters received via the control signal, the master control circuit can control the operation of the RF/AC/DC control circuits which in turn can determine the operation of the coupled SLIM-MS 100. In some implementations, RF/AC/DC control circuits can be physically distributed over the coupled SLIM-MS 100. For example, one or more of the RF/AC/DC control circuits can be located on the coupled SLIM-MS 100. The controller 150 can receive power from a power source 170 (e.g., DC power source that provides a DC voltage to the controller 150). The various RF/AC/DC control circuits can operate based on the power from the power source 170.

Figure 2:
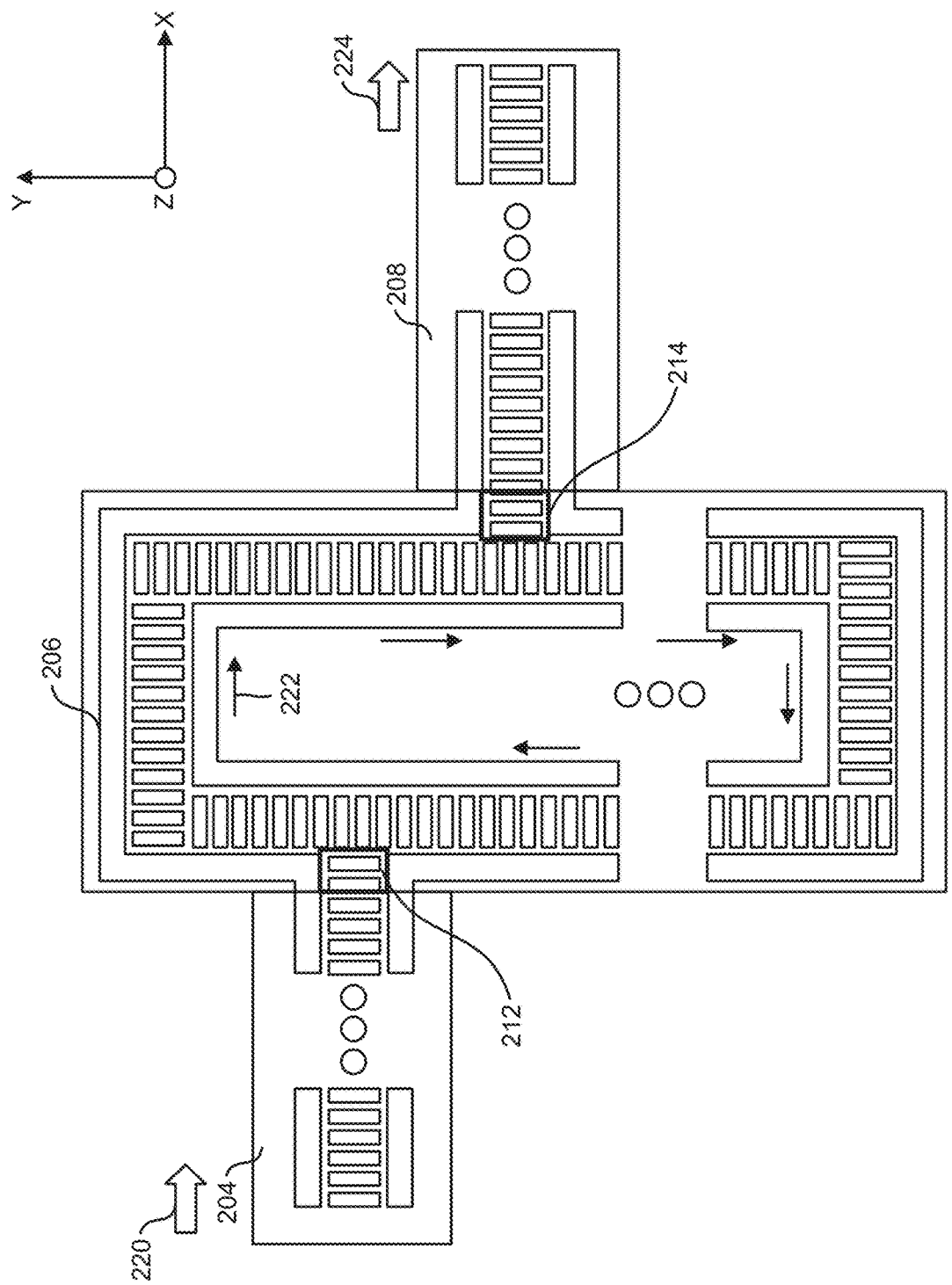
FIG. 2 is a top-down cross-sectional view of an exemplary ion carousel coupled with an exemplary input SLIM device and an exemplary output SLIM device.

FIG. 2 is a top-down cross-sectional view of an exemplary ion carousel 206 coupled with an input SLIM device 204 and an output SLIM device 208. The ion carousel 206 is configured to receive ions from an input SLIM device 204 and eject ions into an output SLIM device 208 for detection by a mass spectrometer. As shown in FIG. 2, ion carousel 206, input SLIM device 204 and output SLIM device 208 include arrays of electrodes that receive a voltage signal from a voltage source, and generate a potential that can manipulate the ions. For example, the potential generated by electrodes in the input SLIM device 204 can perform ion mobility separation on a gas mixture from an ionization source (e.g., ionization source 102), and guide an ion packet resulting from the mobility separation to the ion carousel 206 along an input path 220. The electrodes in the ion carousel 206 can generate a potential waveform that can be configured to travel along a closed path 222. The traveling potential wells can trap the ions from the input SLIM device 204, and transport them along the closed path 222. Output SLIM device 208 can direct ions ejected from the ion carousel 206 to the mass spectrometer along an output path 224.

The ion carousel 206 can include an input switch 212 and an output switch 214. The input switch 212 can regulate the injection of ions from the input SLIM device 204 into the ion carousel 206. The input switch 212 can include multiple electrodes that can receive a voltage signal (e.g., from a DC control circuit in the controller 150) and generate an input switching potential (switched-on state) that can prevent ions packets in the input SLIM device 204 from entering the ion carousel 206. During an accumulation period, the input switch 212 can allow ion packets from the input SLIM device 204 to enter the ion carousel 206 (switched-off state). In one implementation, the input switch can generate a second input switching potential that can push the ion packet into the ion carousel 206.

The output switch 214 can regulate the ejection of ions from the ion carousel 206 to the output SLIM device 208. The output switch 214 can include multiple electrodes that can receive a voltage signal (e.g., from a DC control circuit in the controller 150) and generate an output switching potential (confinement state of output switch 214) that can prevent ions packets in the ion carousel 206 from entering the output SLIM device 208. During an ejection period, the output switch 214 can direct ions trapped in potential wells of the ion carousel into the output SLIM device 208 to enter the mass spectrometer (ejection state of the output switch 214). The output switch can generate a second output switching potential that can push ions trapped in potential wells into the output SLIM device 208.

Each of the ion carousel 206, input SLIM device 204, output SLIM device 208, input switch 212 and output switch 214 include a second surface (e.g., parallel to the x-y plane) displaced from the surface illustrated in FIG. 2 along the z-direction. Movement of ions (e.g., from input SLIM device 204 to ion carousel 206, from ion carousel 206 to the output SLIM device 208) is confined between the two surfaces. In some implementations, ion carousel 206, input SLIM device 204, output SLIM device 208, input switch 212 and output switch 214 can include multiple pairs of surfaces.

Figure 3A:
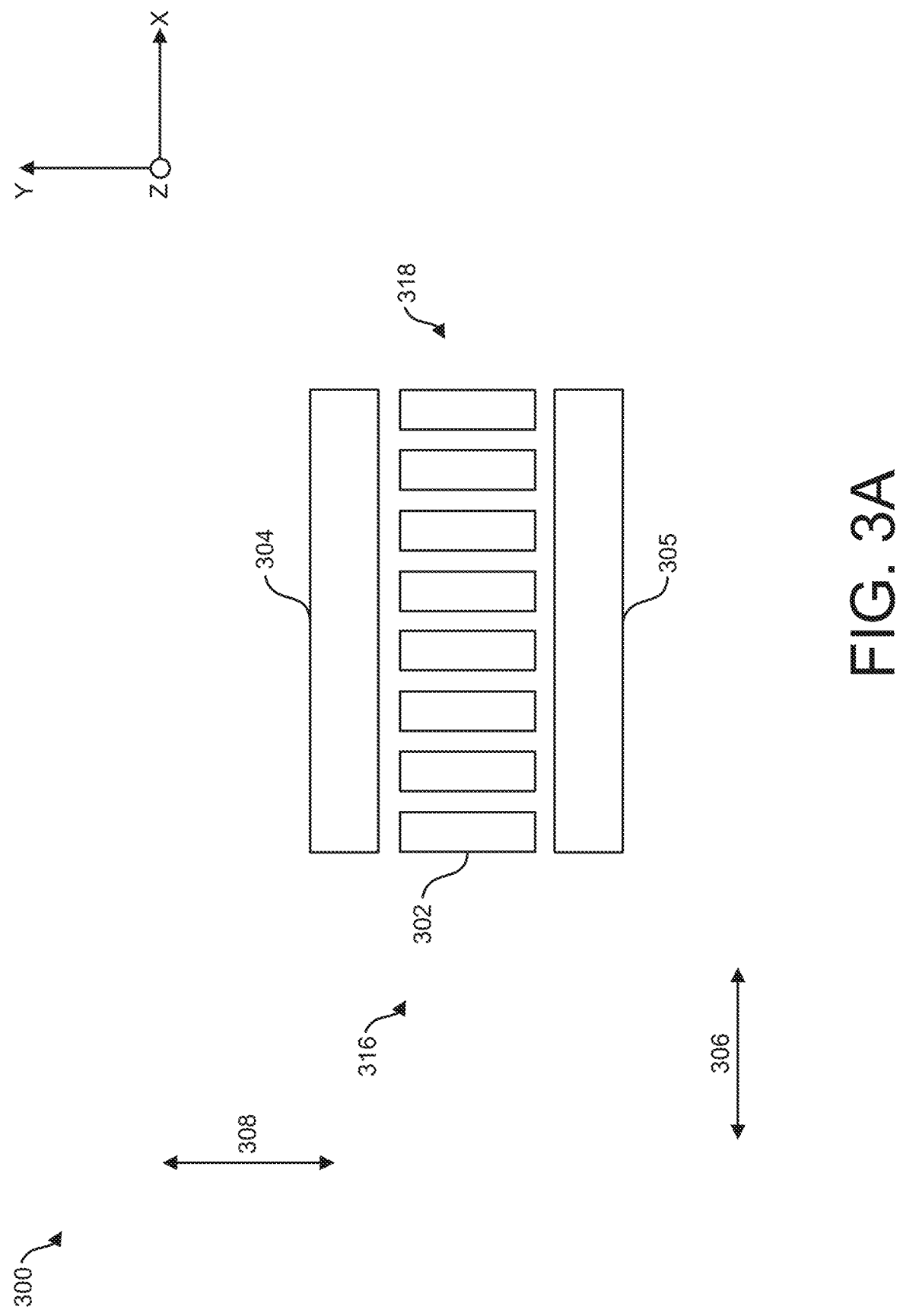
FIG. 3A is an illustration of a cross-section of an exemplary SLIM device.

FIG. 3A is an illustration of a cross-section of an exemplary electrode arrangement 300 located on a first surface or a second surface (e.g., parallel to the x-y plane and displaced from the surface illustrated in FIG. 3A along the z-direction). Various components of the coupled SLIM-MS 200 (e.g., surface of ion carousel 206, input SLIM device 204, output SLIM device 208, etc.) can include the electrode arrangement 300. The electrode arrangement 300 includes an inner array of electrodes 302 coupled to both the first and/or second surfaces, and arranged along a longitudinal axis 306. The inner array of electrodes 302 are configured to receive an RF voltage and generate a pseudopotential that inhibits ions from approaching the first (or second) surface. The RF voltage applied to adjacent electrodes of the inner array of electrodes can be phase shifted (e.g., by 45 degrees, 90 degrees, 135 degrees, 180 degrees, etc.) The pseudopotential can confine the ions in the z-direction between the first and the second surfaces. The inner array of electrodes 302 can receive a DC voltage and generate a traveling DC or AC along the x-axis (longitudinal axis 306) potential that can separate ions based on their mobility. For example, electrode arrangement 300 can receive a mixture of ions (e.g., from an ionization source at a first end 316) and produce an ion packet with ions separated based on mobility (e.g., at a second end 318). The electrode arrangement 300 also includes outer electrodes 304 and 305 that can receive a second DC voltage and generate a confinement potential along the y-axis (lateral direction). The confinement potential can prevent ions over the inner array of electrodes 302 from escaping in the lateral direction.

The application of the first DC voltage, the second DC voltage and the RF voltage can be controlled by a controller (e.g., controller 150). For example, the aforementioned voltages can be produced by one or more voltage sources. The controller can also control the operating parameters of these voltage sources (e.g., amplitude of the voltages, frequency of the RF voltage, traveling speed of the first DC voltage, and the like).

Figure 3B:
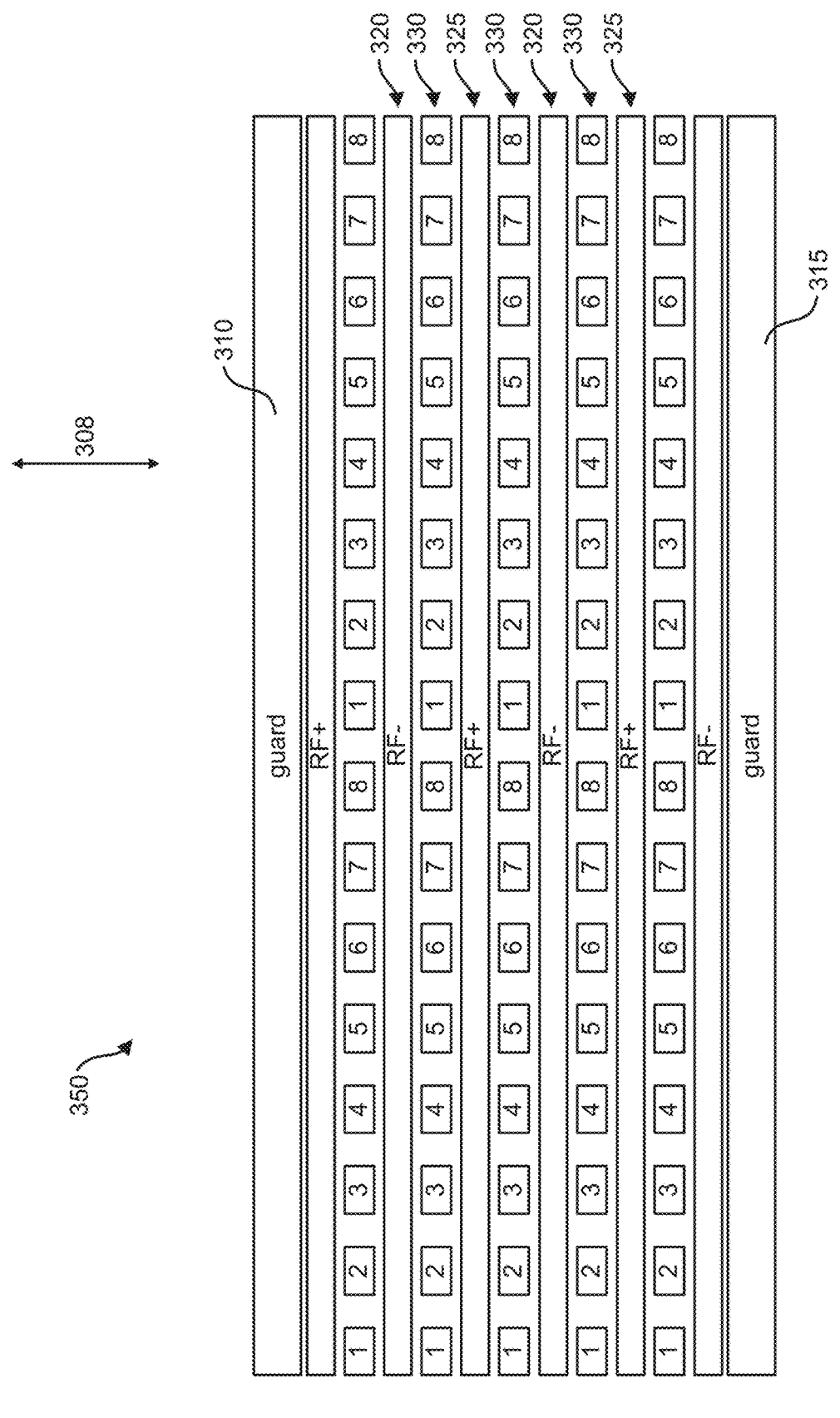
FIG. 3B is an illustration of a cross-section of another exemplary SLIM device.

FIG. 3B is an illustration of a cross-section of another exemplary electrode arrangement 350. Various components of the coupled SLIM-MS 200 (e.g., surface of ion carousel 206, input SLIM device 204, output SLIM device 208, etc.) can include the electrode arrangement 350. The electrode arrangement 350 can be a travelling wave (TW) SLIM device and can include a first outer array of electrodes 310 (also referred to as guard electrodes 310) and a second outer array of electrodes 315 (also referred to as guard electrodes 315) that can receive a DC voltage. The outer array of electrodes 310 and 315 can generate a DC potential that can confine the electrodes along the lateral direction 308. The electrode arrangement 350 can include a first inner array of electrodes 330, positioned between an adjacent pair of second inner array of RF electrodes 320 (RF−) and 325 (RF+).

The first inner array of electrodes 330 can include multiple electrodes that are segmented/arranged along (or parallel to) the propagation axis. The first inner array of electrodes 330 can receive a second voltage signal and generate a drive potential (or traveling potential waveform) that can drive ions along the longitudinal axis 306. The drive potential can include one or more of a sinusoidal waveform, a rectangular waveform, a sawtooth waveform, a biased sinusoidal waveform, and the like. The drive potential can lead to separation of ions based on their mobility as they move along the longitudinal axis 306. If the speed of the drive potential is less than the speed associated with ions having the lowest mobility, the drive potential can transport the ions without ion mobility separation.

In some implementations, adjacent electrodes of the first inner array of electrodes can receive AC voltages that are phase shifted. An RF voltage waveform can be applied to the second inner array of RF electrodes 320 and 325. The RF voltage waveforms applied to the array of electrodes 320 can be out of phase (e.g., 180 degrees) with the RF voltage waveforms applied to the adjacent inner array of electrodes 325. The second inner array of electrodes can generate a pseudopotential when applied with the RF voltage waveforms. The pseudopotential can repel ions away from the electrode arrangement 350.

The electrode arrangement 350 can include guard electrodes 310 and 315 that are positioned adjacent to the outer most of the first/second plurality of electrodes. For example, the guard electrodes 310 and 315 can be located at the edges of the electrode arrangement 300 along the lateral direction. The guard electrodes 310 and 315 can receive a voltage signal (e.g., DC voltage signal from a DC control circuit) and generate a guard potential that can confine ions in the ion channels between the guard electrodes along the lateral direction 308.

The first inner array of electrodes, first inner array of RF electrodes, and the guard electrodes can be connected to one or more voltage control circuits (e.g., voltage control circuits in the controller 150). In some implementations, electrodes 320 and 325 can receive radio frequency (RF) signals that are phase shifted with respect to each other. In some implementations, the master control circuit can control the operation of two RF control circuits to generate two RF voltage signals that are phase shifted from one another (e.g., by 0 degrees, 15 degrees, 30 degrees, 45 degrees, 60 degrees, 75 degrees, 90 degrees, 105 degrees, 120 degrees, 135 degrees, 150 degrees, 165 degrees, 180 degrees, etc.).

Figure 4:
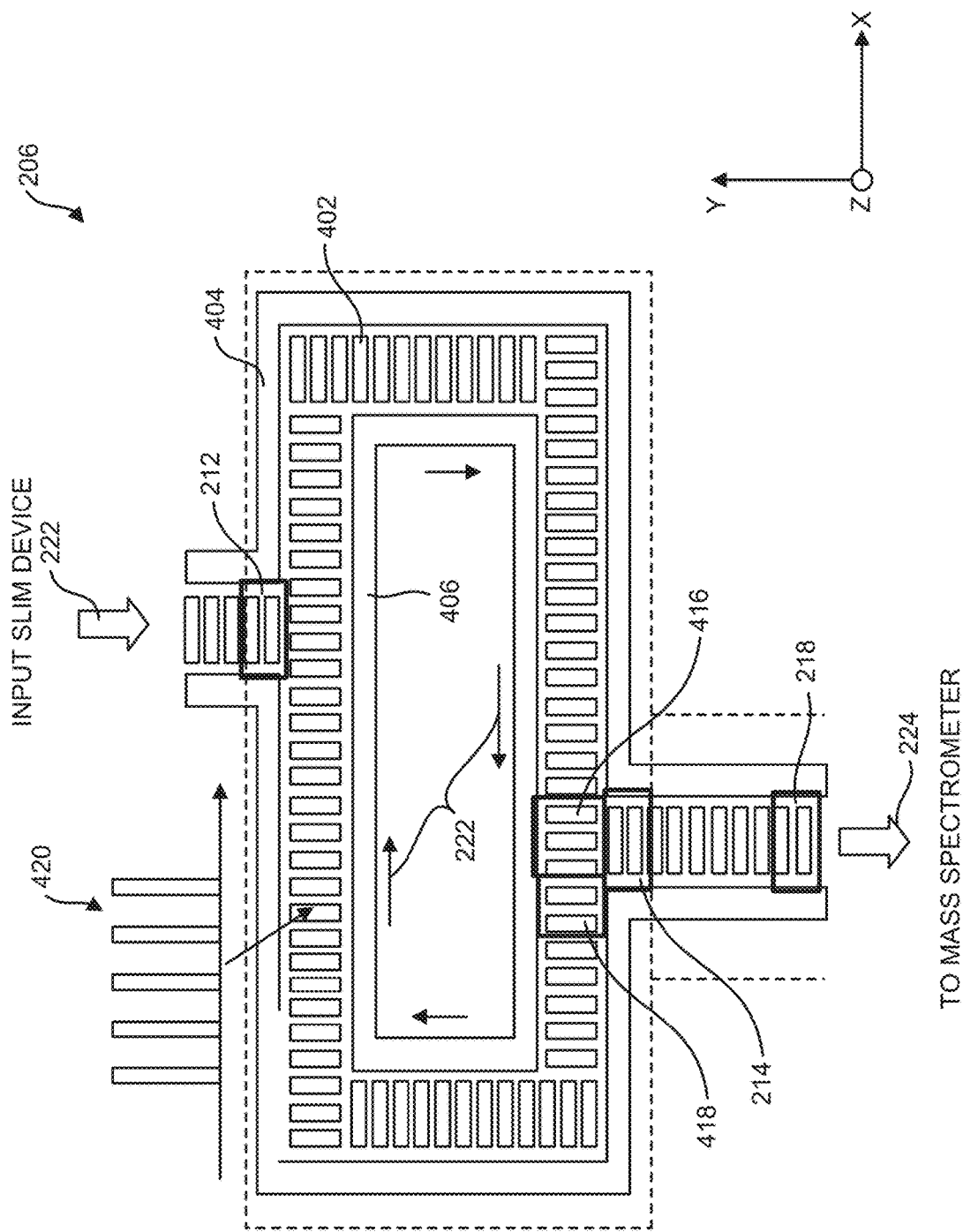
FIG. 4 is an illustration of a cross-section of an exemplary ion carousel.

FIG. 4 is an illustration of a cross-section of a top-down view of an exemplary ion carousel 206 located on a first surface. The ion carousel 206 includes a second surface (e.g., parallel to the x-y plane) displaced from the surface illustrated in FIG. 4 along the z-direction. The ion carousel 206 includes an inner array of electrodes 402, a first outer electrode 404 and a second outer electrode 406 coupled to the first surface and the second surface. The inner array of electrodes 402 are configured to receive an RF voltage and generate a pseudopotential that inhibits ions from approaching the two surfaces of the ion carousel 206. The RF voltage applied to adjacent electrodes of the inner array of electrodes can be phase shifted (e.g., by 45 degrees, 90 degrees, 135 degrees, 180 degrees, etc.) The pseudopotential can confine the ions in the z-direction between the two surfaces of the ion carousel 206.

The inner array of electrodes 402 can receive a first DC voltage waveform and generate a potential waveform 420 having multiple potential wells that can travel along the closed path 222. The closed path 222 can be rectangular, circular, and the like. The potential waveform 420 can be generated due application of a multiple DC and/or AC voltages on the segmented electrodes (e.g., segmented along the closed path 222) of the inner array of electrodes 402. The potential waveform 420 can be characterized by operational parameters, for example, a depth, width and travel speed of the potential wells of the potential waveform 420. The potential waveform 420 can receive and trap ions from the input SLIM device (e.g., electrode arrangement 300, electrode arrangement 350, and the like) and move them along the closed path 222 (e.g., based on the motion of the potential waveform 420). The outer electrodes 404 and 406 can receive a second DC voltage and generate a confinement potential along a lateral direction (e.g., orthogonal to the closed path 222). The confinement potential can prevent ions over the inner array of electrodes 402 from escaping in lateral direction.

The input switch 212 and output switch 214 can include multiple electrodes coupled to the first and the second surface. Electrodes of the input switch can receive a voltage signal and generate an input switching potential (switched-on state) that can prevent ions packets in the input SLIM device from entering the ion carousel 206. During an accumulation period, the input switch 212 can allow ion packets from the input SLIM device to enter the ion carousel 206 (switched-off state) and be trapped in one or more potential wells of the potential waveform 420.

By synchronizing the motion of the potential waveform 420 (e.g., portion of the potential wells) with the time of arrival of an ion packet from input SLIM device 204, ions in the ion packet can be placed in different potential wells of the potential waveform 420. For example, the ion packets emerging from the input SLIM device may have undergone mobility based separation in the input SLIM. As a result, ion sub-packets that include ions with different mobility ranges can arrive the ion carousel 206 at different times. The temporal separation of ion packet into ion sub-packets based on mobilities, can facilitate trapping of the various ion sub-packet into different potential wells of the potential waveform 420.

In some implementations, the inner array of electrodes 402 can include the first inner array of electrodes 330 and adjacent pair of second inner array of electrodes 320 and 325. As described in reference to FIG. 3B, the first inner array of electrodes 330 can receive an AC voltage waveform and can generate a potential waveform (e.g., potential waveform 420) that has multiple potential wells that can travel along the closed path 222. The pair of second inner array of electrodes 320 and 325 can receive RF voltages (e.g. RF voltage applied to electrodes 320 can be phase shifted from the RF voltage applied to electrodes 325) and generate a pseudopotential. The pseudopotential can inhibit ions form approaching the first and the second surfaces.

Figure 5:
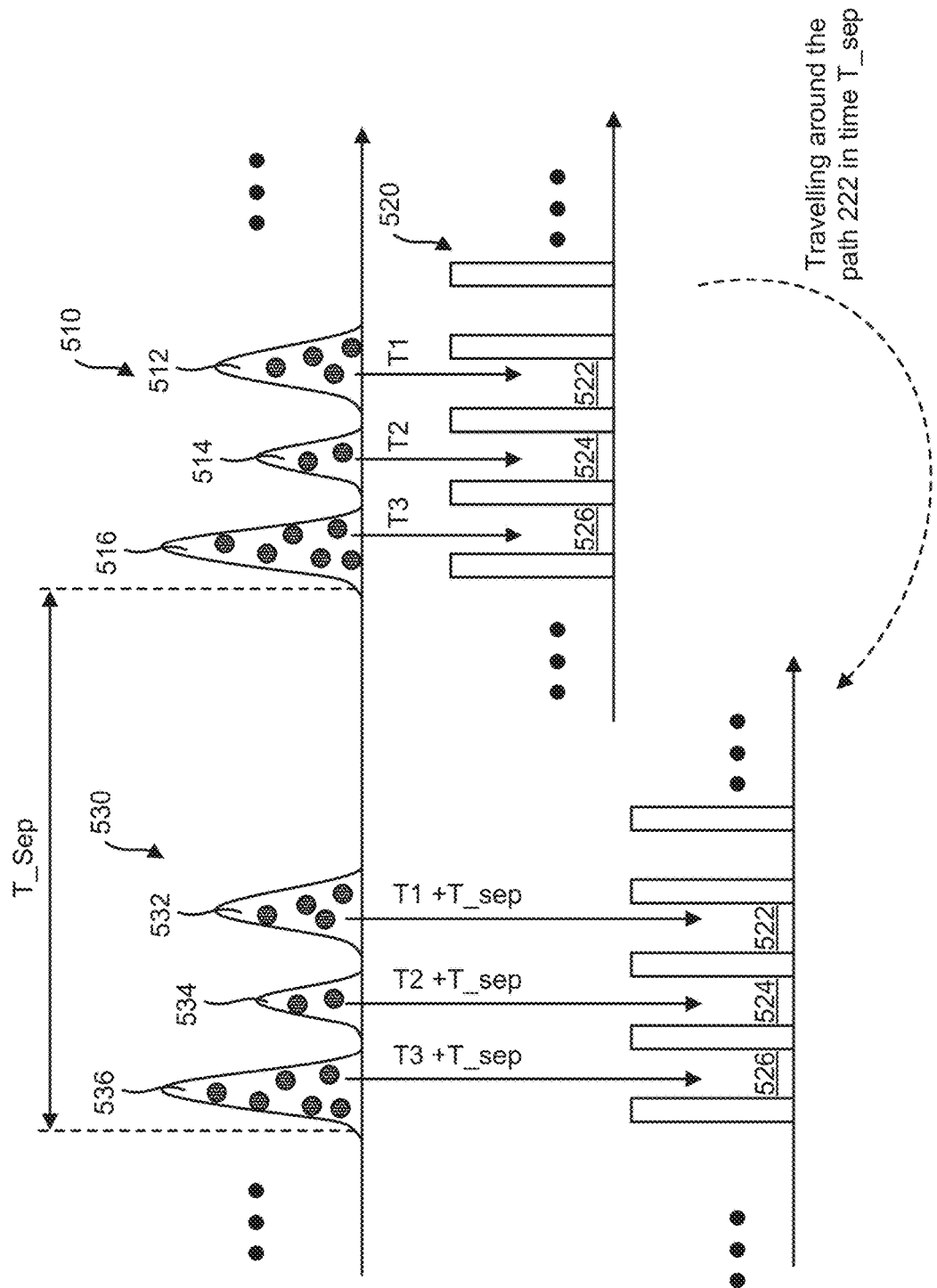
FIG. 5 is a schematic illustration of an exemplary mobility-based accumulation of ions in a waveform traveling in the accumulation device of FIG. 4.

FIG. 5 is a schematic illustration of an exemplary mobility-based accumulation of ions in a waveform 520 traveling in the ion carousel 206. Ion packet 510 which is produced by the input SLIM device 204 can enter the ion carousel 206 during an accumulation period (input switch 212 in the switched-off state). The ion packet 510 includes ion sub-packets 512, 514 and 516 that include ions with different ranges of mobility. For example, ion sub-packet 512 enters the ion carousel 206 at time T1; ion sub-packet 514 enters the ion carousel at time T2; and ion sub-packet 516 enters the ion carousel at time T3. The ion sub-packet 512 has higher mobility than ion sub-packet 514 which has higher mobility than ion sub-packet 516. In other words, ion sub-packet 512 arrives before the ion sub-packet 514 which arrives before the ion sub-packet 516 (T1<T2<T3). At time T1, the potential well 522 can be positioned adjacent to the input switch 212 and can receive the ion sub-packet 512. At time T2, the potential waveform 520 has traveled along the closed path 222 such that the potential well 524 is positioned adjacent to the input switch 212, and can receive the ion sub-packet 514. At time T3, the potential waveform 520 has traveled further along the closed path 222 such that the potential well 526 can be positioned adjacent to the input switch 212, and can receive the ion sub-packet 516.

The input SLIM device 204 can perform multiple ion separation events successively and generate multiple ion packets that are separated in time (e.g., time of arrival at the ion carousel 206). For example, the input SLIM device 204 can generate a second ion packet 530 that can be temporally separated from the ion packet 510 by a separation time (T_sep). The ion mobility profile of the two ion packets can be similar (e.g., when the operating parameters of the input SLIM device 204 does not change substantially between the two ion separation events). The second ion packet can include ion sub-packets 532, 534 and 536 that have ion mobility ranges similar to that of ion sub-packets 512, 514 and 516, respectively.

After the ions in the ion sub-packets 512, 514 and 516 have been received and trapped in the potential wells 522, 524 and 526, respectively, the potential waveform 520 can travel along the closed path 222 and return back to the input switch 212. If time taken by the potential wells 522, 524 and 526 to complete a full revolution around the closed path 222 is similar (e.g., equal) to a temporal separation T_sep between ion packet 510 and the successive ion packet 530, potential wells 522, 524 and 526 can receive the ion sub-packet 532, 534 and 536, respectively. In some implementations, the potential wells 522, 524 and 526 to complete a several revolutions around the closed path 222 during the temporal separation T_sep. In some implementations, the potential wells 522, 524 and 526 can oscillate (e.g., along the x-direction) and capture the ion sub-packets 532, 534 and 536, respectively. This process can be repeated so that ions having similar mobility are trapped in the same potential well of the potential waveform 520. The process of ion accumulation can be substantially lossless. For example, all ions received by the ion carousel 206 from the input SLIM device 204 can be ejected to the output SLIM device 208.

Figure 6:
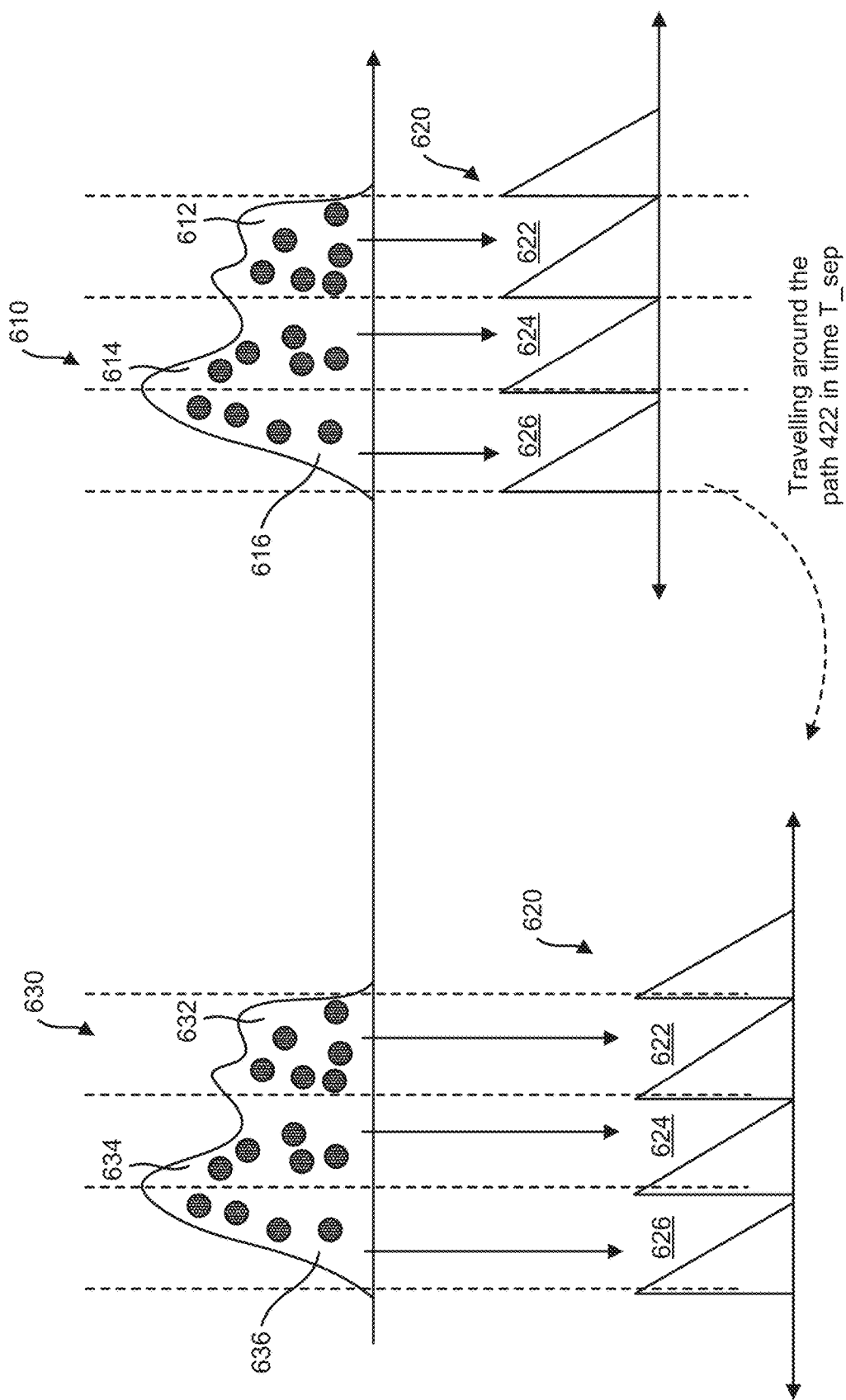
FIG. 6 is a schematic illustration of an exemplary mobility-based accumulation of ions in a waveform traveling in the accumulation device of FIG. 4.

FIG. 6 is a schematic illustration of another exemplary mobility-based accumulation of ions in a potential waveform 620 traveling in the ion carousel 206. Ion packet 610 which is produced by the input SLIM device 204 can enter the ion carousel 206 during an accumulation period (period when input switch 212 is in the switched-off state). The ion packet 610 includes ion sub-packets 612, 614 and 616 that include ions with different mobility ranges. The ion sub-packets can enter the ion carousel at different times. For example, ion sub-packets 612, 614 and 616 arrive successively, and are trapped in triangular potential wells 622, 624 and 626, respectively. The potential wells 622, 624 and 626 can travel along (surf) the closed path 222 to return to the input switch 212. By setting the time of travel (surfing time) of the potential wells 622, 624 and 626 around the closed path 222 similar (e.g., equal) to the temporal separation T_sep between ion packet 610 and the successive ion packet 630, potential wells 622, 624 and 626 can receive the ion sub-packet 632, 634 and 636, respectively. This can allow for trapping of ions with similar mobilities in separate potential wells. For example, ion sub-packets 612 and 632 are trapped in potential well 622; ion sub-packets 614 and 634 are trapped in potential well 624; and ion sub-packets 616 and 636 are trapped in potential well 626.

In some implementations, potential waveforms 420, 520 and 620 can include one or more of a square waveform, a sinusoidal waveform, a triangular waveform, a ramp with a positive gradient, a ramp with a negative gradient, and the like. Potential waveforms 420, 520 and 620 can be generated by application of a DC and/or an AC voltage waveforms to inner array of electrodes 402 (e.g., inner array of electrodes including the electrode arrangements 300 and/or 350).

Returning to FIG. 4, the output switch 214 can regulate the ejection of ions trapped in the potential wells (e.g., potential wells 522-526, 622-626, etc.) to the output SLIM device 208. The output switch 214 can include multiple electrodes coupled to the first and the second surface. The electrodes of the output switch 214 can receive a voltage signal, and generate an output switching potential (confinement state) that can prevent ions in the ion carousel 206 (e.g., ions trapped in potential wells of potential waveforms 420, 520, 620 etc.) from entering the output SLIM device 208. For example, the voltage signal applied to the electrodes of the output switch 214 can be similar to the voltage signal applied to the first outer electrode 404. This can prevent ions in the ion carousel 206 from entering the output SLIM device 208.

During an ejection period, the output switch 214 can direct ions trapped in potential wells of the ion carousel 206 into the output SLIM device 208 (ejection state). The output switch 214 can generate a second output switching potential that can push ions trapped in the ion carousel 206 into the output SLIM device 208. For example, the potential difference between the switching potential (e.g., AC and/or DC potential) applied to output switch 214 and the potential (e.g., AC and/or DC potential) applied to electrodes 416 of the inner array of electrodes can result in an electric field that can push the ions along the output path 224 towards the output SLIM device 208. Additionally or alternately, a barrier potential can be applied to electrodes 418 of the inner array of electrodes which can prevent ions trapped in the potential wells from moving away from the output switch 214 (e.g., along the closed path 222). A second output switch 218 can control the exit of ions/ion packets from the output SLIM device 208 along the output path 224 (e.g., to a mass spectrometer). For example, the second output switch 218 can receive a DC and/or an AC voltage that can generate a barrier potential which can prevent ions in the output SLIM device 208 from exiting to the mass spectrometer. The barrier potential can be periodically generated which can determine the periodicity of ion packets ejected into the mass spectrometer.

Figure 7:
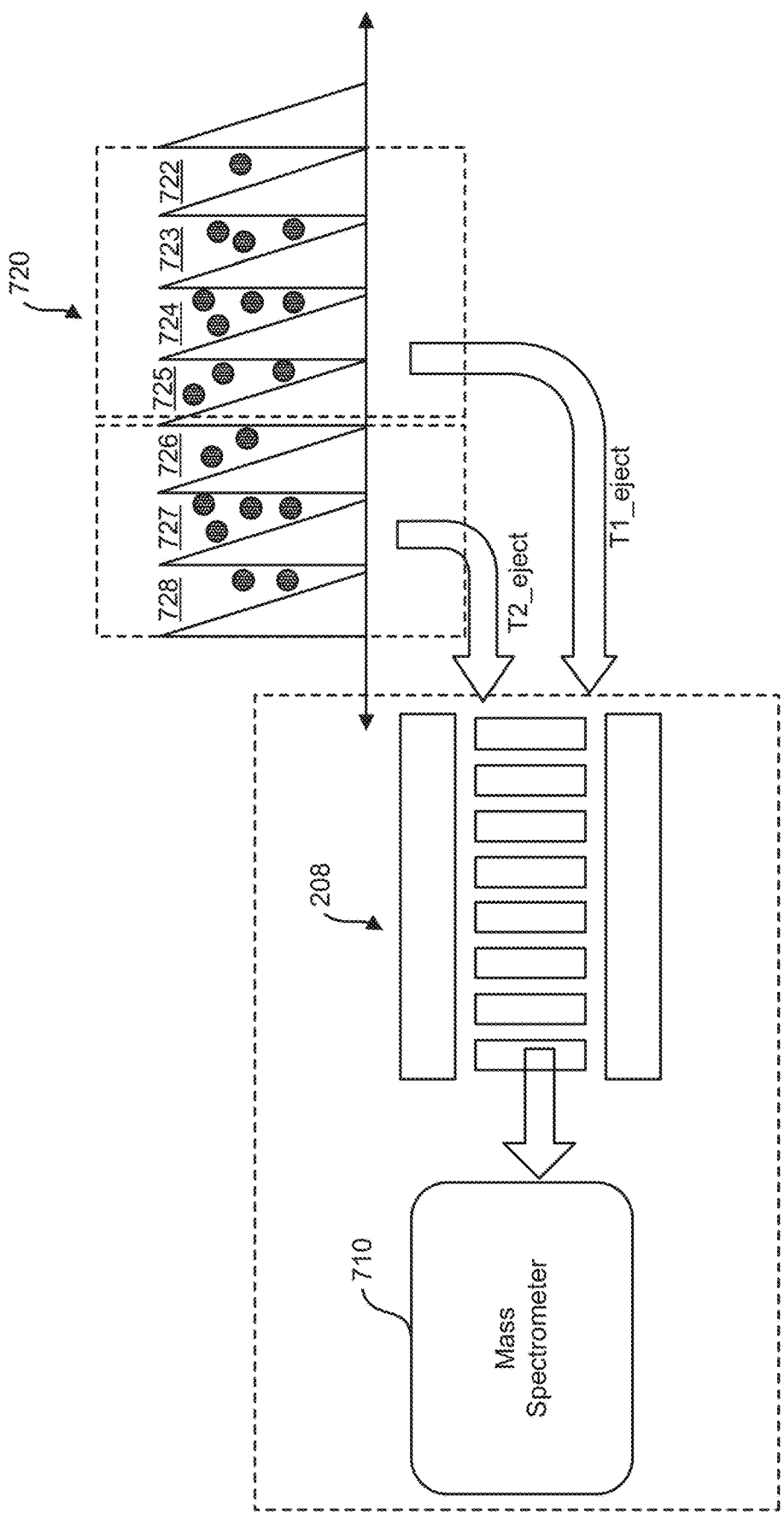
FIG. 7 is a schematic illustration of an exemplary mobility-based ejection of ions in from the accumulation device of FIG. 4 to an output SLIM device.

FIG. 7 is a schematic illustration of an exemplary mobility-based ejection of ions in waveform 720 from ion carousel 206 to the output SLIM device 208. During a first ejection period (T1_eject) ions trapped in potential wells 722-725 are ejected into the output SLIM device 208. During a second ejection period (T2_eject) ions trapped in potential wells 726-728 are ejected into the output SLIM device 208. This can be done, for example, by applying an output switching potential to the output switch 214 and/or applying a barrier potential to the electrodes 418 for a time period T1_eject. During T1_eject, potential wells 722-725 can approach the output switch 214, and the output switching potential can drive ions trapped in the potential wells 722-725 into the output SLIM device 208. During T2_eject, potential wells 726-728 can approach the output switch 214, and the output switching potential can drive ions trapped in the potential wells 726-728 into the output SLIM device 208.

The ejection time periods T1_eject and T2_eject can be separated by a delay time. The delay time can be determined (e.g., by controller 150) based on the scan time of the mass spectrometer 710. For example, properties of ions trapped in the waveform 720 (e.g., mass of the ions, charge of the ions, etc.) and/or operational parameters of the mass spectrometer 710 can determine the time needed by the mass spectrometer 710 to detect mass spectra (scan time) of ions trapped in the waveform 720 (e.g., ions in potential wells 722-725, ions in potential wells 726-728, etc.). The delay time can be set to a value greater than the scan time. This can prevent overlap of mass spectra of ions released at time T1_eject and T2_eject.

As described before, IMS-MS coupling (e.g., coupling between ion carousel 206 and mass spectrometer 710) can generate an IMS-MS spectrum that describes a two-dimensional separation of ions based on ion mobility and mass-to-charge ratio. The ion mobility resolution can be determined based on mobility separation between adjacent ion mobility peaks. For example, ion mobility resolution of the ion carousel 206 can be determined based on ion mobility separation between ion packets in adjacent potential wells. The mass spectrum of the ejected ions (generated by the mass spectrometer 710) represents ions having the aforementioned mobility range.

The mobility range of ions ejected during an ejection period can be varied by changing the duration of the ejection period. For example, increasing the duration of ejection period (e.g., T1_eject, T2_eject, etc.) can increase the mobility range of ejected ions and decreases the ion mobility resolution and vice versa. In some implementations, the mobility range of ions ejected during an ejection period can be varied by changing the mobility range of ions trapped in one or more potential wells (e.g., potential wells 722-728). The mobility range of ions in a potential well can be determined by the mobility based ion separation event achieved in the input SLIM device 204. Increasing the mobility separation of an ion packet in the input SLIM device 204 (e.g., by increasing the length of 204, etc.) can decrease the mobility range of ions trapped in the potential wells of the waveform (e.g., 520, 620, 720, etc.) in the ion carousel 206.

In some implementations, desirable mobility resolution can be achieved by varying one or more of shape, speed, and height of potential waveform 420, 520 and/or 620 generated by inner array of electrodes 402. Changing the amplitude and/or frequency of the RF voltage applied to the inner array of electrodes 402 can vary the transmission efficiency of ions through the ion carousel 206, vary the transmission of ions of various mass to charge (m/z) ratios.

The application of the first DC voltage, the second DC voltage and the RF voltage can be controlled by a controller (e.g., controller 150). For example, the controller can vary the height and width of the potential wells. The controller can also control the travel speed (e.g., along the closed path 222) of the potential wells. For example, the controller can vary the speed (e.g., increase or decrease the speed) of the potential wells; generate a static potential well, etc.

In some implementations, ions from the ion carousel (e.g., ion carousel 206) can be selectively ejected to the output SLIM device (e.g., output SLIM device 208) based on their mobility. In some implementations, ion mobility and mass-to-charge ratio of an ion can be correlated. For example, the ion mobility (e.g., indicative of structure of the ion) of ions can depend on their mass-to-charge ratios (e.g., quantified to be around 15%). In exemplary targeted analysis, mobility range in which an ion of a given mass-to-charge ratio will appear may be known a priori. After mobility-based separation of ions in the first input SLIM, mass-to-charge ratios of ions can be mapped to the various potential wells in the ion carousel. As a result, ions of a given mass-to-charge ratio (or a range of mass-to-charge ratios) can be selectively transferred to the mass spectrometer (via the output SLIM device) by selectively releasing ions from the corresponding potential wells. This can improve the performance of mass spectrometer (e.g., reduce time required to perform mass spectroscopy measurement).

Figure 8C:
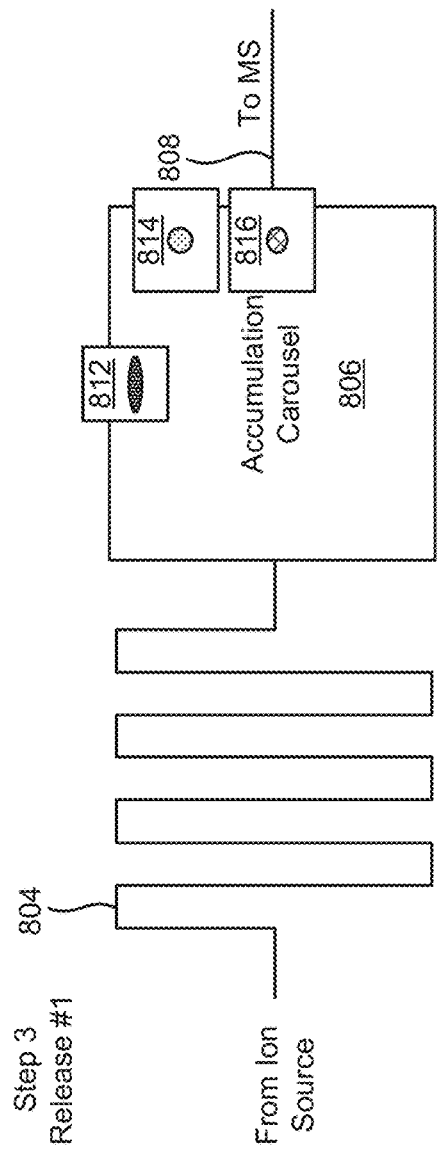

In some implementations, the time of release of ions from the various potential wells in the ion carousel to the output SLIM device can be resorted (e.g., resorted based on their mobility, mass-to-charge ratio). FIGS. 8A-8E illustrate exemplary resorting of time of release of ions in various potential wells. FIG. 8A illustrates exemplary separation of ions based on their mobility by the input SLIM device 804. As a result of this separation, ion packet 816 arrives at the ion carousel 806, followed by ion packet 814 which in turn is followed by ion packet 812 (ion mobility of 816>ion mobility of 814>ion mobility of 812). FIG. 8B illustrates the ion packets 812-816 trapped in different potential wells (not shown) traveling in the ion carousel 806. FIG. 8C illustrates the ejection of ion packet 816. Ion packet 816 is the first ion packet to arrive at the intersection of ion carousel 806 and the output SLIM 808, and is ejected from the ion carousel 806 to the output SLIM 808. In some implementations, generation of an ejection potential by an output switch (during a first ejection period) can be synchronized with the time of arrival of the ion packet 816 at the intersection).

Figure 8D:
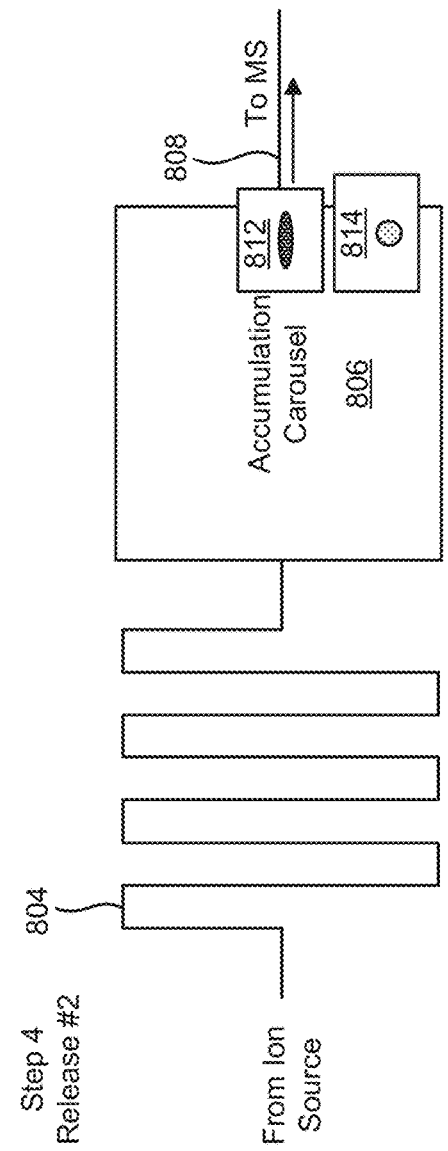
Figure 8E:
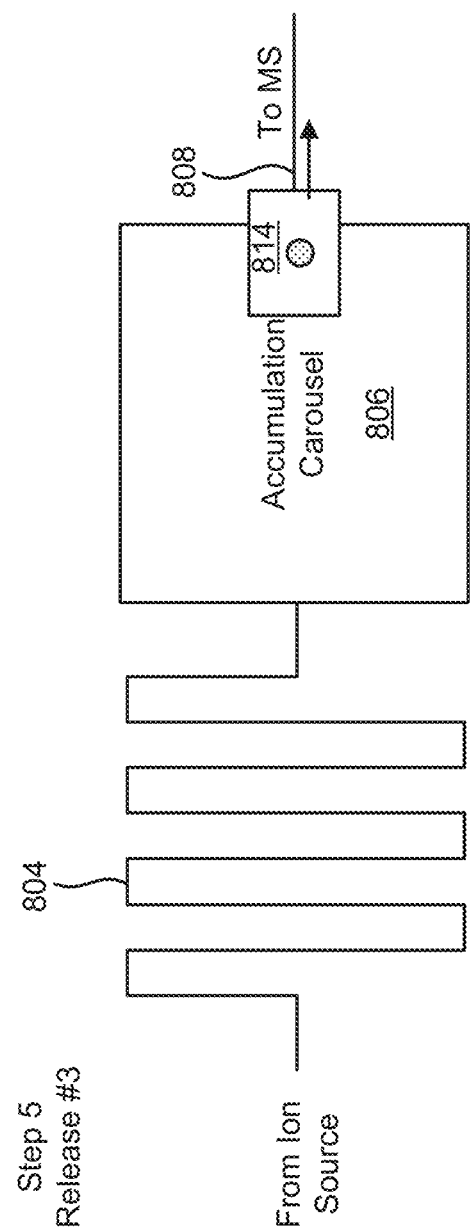

FIG. 8D illustrates the ejection of ion packet 812. Ion packet 814 arrives at the intersection after the ion packet 816 and continues to travel along the ion carousel 806 instead of being ejected to the output SLIM 808. In some implementations, generation of a confinement potential by the output switch (during a first confinement period) can be synchronized with the time of arrival of the ion packet 814 at the intersection). Ion packet 812 arrives at the intersection after the ion packet 814, and is ejected from the ion carousel 806 to the output SLIM 808. In some implementations, generation of an ejection potential by the output switch (during a second ejection period) can be synchronized with the time of arrival of the ion packet 812 at the intersection). Following the ejection of ion packet 812, the direction of travel of ion packet 814 can be reversed. The ion packet 814 can once again arrive at the intersection and is ejected from the ion carousel 806 to the output SLIM 808. In some implementations, generation of an ejection potential by the output switch (during a third ejection period) can be synchronized with the second time of arrival of the ion packet 814 at the intersection).

FIG. 9A illustrates the time of arrival of ion packets 812-816 at the ion carousel 806 from the input SLIM device 804. As discussed above, the time of arrival of ion packet 816 is before the time of arrival of the ion packet 814 which is before the time of arrival of the ion packet 816. FIG. 9B illustrates the ejection of ion packets 812-816 (e.g., which is related to the order in which the ion packets are scanned) from the ion carousel 806 to the input SLIM device 804. As discussed above, ion packet 816 is ejected (and scanned by the mass spectrometer) followed by ion packet 812 which is followed by ion packet 814.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. An ion carousel comprising:
   a first surface; and
   a second surface adjacent to the first surface, the first and the second surfaces defining an ion confinement volume, the second surface including a first inner array of electrodes arranged along a first loop path and configured to receive, at a first location on the first path, a first ion packet and a second ion packet temporally separated from the first ion packet by a separation time;
   wherein the first inner array of electrodes are configured to generate a traveling waveform which includes a plurality of potential wells that travel along a first direction on the first loop path and are configured to receive ions from the first and second ion packets, the plurality of potential wells comprising at least a first potential well and a second potential well; and
   an output switch configured to selectively eject ions from the first potential well out of the carousel at time $T_1$ and eject ions from the second potential well out of the carousel at time $T_2$.

2. The ion carousel of claim 1, wherein the first ion packet includes a first sub-packet of ions having a first mobility and a second sub-packet of ions having a second mobility, and the second ion packet includes a third sub-packet of ions having the first mobility and a fourth sub-packet of ions having the second mobility.

3. The ion carousel of claim 2, wherein the first potential well receives the first sub-packet of ions and the third sub-packet of ions, and the second potential well receives the second sub-packet of ions and the fourth sub-packet of ions.

4. The ion carousel of claim 1, wherein the difference in time between $T_1$ and $T_2$ is based on a scan rate for a mass spectrometer which is configured to receive the ejected ions from carousel.

5. The ion carousel of claim 1, wherein the velocity of the traveling waveform is set at a value below the speed of the ions in the first and second packet with the lowest mobility preventing mobility separation from occurring as the ions traverse the first loop path.

6. The ion carousel of claim 1, wherein the velocity of the traveling waveform is set at a value higher than the speed of the ions in the first and second packet with the lowest mobility thereby promoting mobility based separation to occur as the ions traverse the first loop path.

7. The ion carousel of claim 2, wherein the first sub-packet of ions is temporally separated from the second sub-packet of ions prior to receipt into the carousel and the third sub-packet of ions is temporally separated from the fourth sub-packet of ions prior to entry into the carousel.

8. The ion carousel of claim 1, wherein the separation time between receipt of the first ion packet and the second ion packet at the first location correlates with the velocity of the traveling waveform.

9. The ion carousel of claim 1, wherein the output switch is proximal to a second location along the first path, the output switch is configured to:
   generate a first ejection potential during a first ejection period, the first ejection potential configured to drive ions out of the ion carousel at the second location, and
   generate a first confinement potential during a first confinement period, the first confinement potential configured to prevent ions in the ion carousel from exiting the ion carousel at the second location.

10. The ion carousel of claim 9, wherein the output switch is configured to selectively transfer ions in the first potential well out of the ion carousel by synchronizing the first ejection period with a first time of arrival of the first potential well at the second location.

11. The ion carousel of claim 10, wherein the output switch is configured to generate a second ejection potential during a second ejection period, the second ejection potential configured to drive ions out of the ion carousel at the second location.

12. The ion carousel of claim 11, wherein the output switch is configured to selectively transfer ions in the second potential well out of the ion carousel by synchronizing the second ejection period with a second time of arrival of the second potential well at the second location.

13. The ion carousel of claim 10, wherein the output switch is configured to prevent ions in the second potential well from exiting the ion carousel by synchronizing the first confinement period with a second time of arrival of the second potential well at the second location.

14. The ion carousel of claim 13, wherein the first ion packet includes a fifth sub-packet of ions having a third mobility and the second ion packet includes a sixth sub-packet of ions having the third mobility, wherein the plurality of potential wells include a third potential well configured to receive the fifth sub-packet and the sixth sub-packet.

15. The ion carousel of claim 14, wherein the output switch is configured to selectively transfer ions in the third potential well out of the ion carousel by synchronizing the second ejection period with a third time of arrival of the third potential well at the second location.

16. The ion carousel of claim 15, wherein the first inner array of electrodes are configured to reverse the first direction of travel of the second potential well and direct the second potential well to the second location.

17. The ion carousel of claim 16, wherein the output switch is configured to selectively transfer ions in the second potential well out of the ion carousel by synchronizing a third ejection period with a fourth time of arrival of the second potential well at the second location, wherein the output switch is configured to generate a third ejection potential during the third ejection period, the third ejection potential configured to drive ions out of the second potential well at the second location.

18. The ion carousel of claim 17, further comprising a controller, the controller includes a first DC control circuit configured to:

apply the first ejection voltage and the first confinement voltage to the output switch during the first ejection period and the first confinement period, respectively; and apply the second ejection voltage to the output switch during the second ejection period.

19. The ion carousel of claim 18, wherein the controller includes a master control circuit communicatively coupled to the first DC control circuit wherein the master control circuit is configured to:

determine one or more of the first ejection period, the first confinement period, and the second ejection period; and provide a first control signal to the DC control switch, wherein the DC control switch is configured to generate one or more of the first ejection voltage during the first ejection period, first confinement voltage during the first confinement period, and the second ejection voltage during the second ejection period.

20. The ion carousel of claim 19, wherein ions in the first potential well, the second potential well and the third potential well are transferred to a first ion manipulation device at the second location, wherein a first end of the first ion manipulation device is coupled to the ion carousel and a second end of the first ion manipulation device is coupled to a mass spectrometer.

21. The ion carousel of claim 1, further comprising a second array of electrodes comprising a first electrode and a second electrode, wherein the first inner array of electrodes is located between the first electrode and the second electrode.

22. The ion carousel of claim 21, wherein the first electrode and the second electrode are configured to receive one or more RF voltages and generate a pseudopotential configured to inhibit ions in the ion confinement volume from approaching the second surface.

23. An ion carousel comprising:

a first surface; and a second surface adjacent to the first surface, the first and the second surfaces defining an ion confinement volume, the second surface including a first inner array of electrodes arranged along a first loop path and configured to receive, at a first location on the first path, a first ion packet and a second ion packet temporally separated from the first ion packet by a separation time;

wherein the first inner array of electrodes are configured to generate a traveling waveform which includes a plurality of potential wells that travel along a first direction on the first loop path and configured to receive ions from the first and second ion packets, the plurality of potential wells comprising at least a first potential well and a second potential well; and an output switch proximal to a second location along the first path, the output switch is configured to:

generate, during a first confinement period, a first confinement potential configured to prevent ions in the potential wells from exiting the ion carousel, generate, during a first ejection period after the first confinement period, a first ejection potential configured to eject ions in the first potential well; and generate, during a second ejection period after the first confinement period, a second ejection potential configured to eject ions in the second potential well.

24. The ion carousel of claim 23, wherein the output switch configured to eject ions from the first potential well out of the carousel at time $T_1$ and eject ions from the second potential well out of the carousel at time $T_2$.

25. The ion carousel of claim 23, wherein the output switch is configured to selectively transfer ions in the first potential well out of the ion carousel by synchronizing the first ejection period with a first time of arrival of the first potential well at the second location.

26. The ion carousel of claim 25, wherein the output switch is configured to generate a second ejection potential during a second ejection period, the second ejection potential configured to drive ions out of the ion carousel at the second location.

27. The ion carousel of claim 26, wherein the output switch is configured to selectively transfer ions in the second potential well out of the ion carousel by synchronizing the second ejection period with a second time of arrival of the second potential well at the second location.

28. The ion carousel of claim 25, wherein the output switch is configured to prevent ions in the second potential well from exiting the ion carousel by synchronizing the first confinement period with a second time of arrival of the second potential well at the second location.

29. A method for accumulating ions comprising:

(i) providing an ion carousel that includes a first surface and a second surface adjacent to the first surface; the first and the second surfaces defining an ion confinement volume, the second surface including a first inner array of electrodes arranged along a first loop path;

(ii) receiving, at a first location on the first path of the ion carousel, a first ion packet and a second ion packet temporally separated from the first ion packet by a separation time;

(iii) generating a traveling waveform using the first inner array of electrodes which includes a plurality of potential wells that travel along a first direction on the first loop path and are configured to receive ions from the first and second ion packets, the plurality of potential wells comprising at least a first potential well and a second potential well; and (iv) selectively ejecting ions from the first potential well out of the carousel at time $T_1$ and ejecting ions from the second potential well out of the carousel at time $T_2$ using an output switch associated with the carousel.

30. The method of claim 29, wherein the first ion packet includes a first sub-packet of ions having a first mobility and a second sub-packet of ions having a second mobility, and the second ion packet includes a third sub-packet of ions having the first mobility and a fourth sub-packet of ions having the second mobility.

31. The method of claim 30, further including the steps of: receiving in the first potential well the first sub-packet of ions and the third sub-packet of ions, and receiving in the second potential well the second sub-packet of ions and the fourth sub-packet of ions.

32. The method of claim 29, wherein the difference in time between $T_1$ and $T_2$ is based on a scan rate for a mass spectrometer which is configured to receive the ejected ions from carousel.

33. The method of claim 29, further including the step of setting a velocity of the traveling waveform at a value below the speed of the ions in the first and second packet with the lowest mobility preventing mobility separation from occurring as the ions traverse the first loop path.

34. The method of claim 29, further including the step of setting a velocity of the traveling waveform at a value higher than the speed of the ions in the first and second packet with the lowest mobility thereby promoting mobility based separation to occur as the ions traverse the first loop path.

35. The method of claim 30, wherein the first sub-packet of ions is temporally separated from the second sub-packet of ions prior to receipt into the carousel and the third sub-packet of ions is temporally separated from the fourth sub-packet of ions prior to entry into the carousel.

36. The method of claim 29, wherein the separation time between receipt of the first ion packet and the second ion packet at the first location correlates with a velocity of the traveling waveform.

37. The method of claim 29, wherein the output switch is proximal to a second location along the first path, the output switch:
   generates a first ejection potential during a first ejection period, the first ejection potential configured to drive ions out of the ion carousel at the second location, and
   generates a first confinement potential during a first confinement period, the first confinement potential configured to prevent ions in the ion carousel from exiting the ion carousel at the second location.

38. The method of claim 37, further including the step of selectively transferring, using the output switch, ions in the first potential well out of the ion carousel by synchronizing the first ejection period with a first time of arrival of the first potential well at the second location.

39. The method of claim 38, further comprising the step of generating a second ejection potential during a second ejection period using the output switch, the second ejection potential configured to drive ions out of the ion carousel at the second location.

40. The method of claim 39, wherein the output switch is configured to selectively transfer ions in the second potential well out of the ion carousel by synchronizing the second ejection period with a second time of arrival of the second potential well at the second location.

* * * * *